US008874151B2

(12) United States Patent
Ogawa et al.

(10) Patent No.: US 8,874,151 B2
(45) Date of Patent: Oct. 28, 2014

(54) WIRELESS COMMUNICATION SYSTEM, MOBILE TERMINAL AND COLLABORATIVE COMMUNICATION METHOD

(75) Inventors: Daisuke Ogawa, Kawasaki (JP); Takashi Dateki, Kawasaki (JP); Takashi Seyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 390 days.

(21) Appl. No.: 13/441,479

(22) Filed: Apr. 6, 2012

(65) Prior Publication Data
US 2012/0196634 A1 Aug. 2, 2012

Related U.S. Application Data

(63) Continuation of application No. PCT/JP2009/067571, filed on Oct. 8, 2009.

(51) Int. Cl.
H04B 7/00 (2006.01)
H04M 1/00 (2006.01)
H04B 7/02 (2006.01)
H04B 7/06 (2006.01)

(52) U.S. Cl.
CPC ............. H04B 7/0639 (2013.01); H04B 7/024 (2013.01); H04B 7/0634 (2013.01)
USPC ......... 455/501; 455/101; 455/562.1; 455/525

(58) Field of Classification Search
CPC ....................................................... H04B 7/024
USPC ............................... 455/501, 562.1, 525, 101
See application file for complete search history.

(56) References Cited

U.S. PATENT DOCUMENTS

| | | | |
|---|---|---|---|
| 8,351,524 B2 * | 1/2013 | Zhou | 375/260 |
| 2006/0240792 A1 | 10/2006 | Sunaga | |
| 2009/0285325 A1 * | 11/2009 | Zhou | 375/267 |
| 2010/0309998 A1 | 12/2010 | Kim et al. | |
| 2011/0206154 A1 * | 8/2011 | Ding et al. | 375/267 |

FOREIGN PATENT DOCUMENTS

| CN | 1855761 A | 11/2006 |
|---|---|---|
| KR | 20090073758 | 7/2009 |

OTHER PUBLICATIONS

International Search Report issued by the Japanese Patent Office corresponding to Japanese Patent Application No. PCT/JP2009/067571 mailed Dec. 8, 2009.

(Continued)

Primary Examiner — Tilahun B Gesesse
(74) Attorney, Agent, or Firm — Myers Wolin, LLC

(57) ABSTRACT

A first base station receives from a mobile terminal identification information indicating a combination of a weight coefficient for the first base station and a weight coefficient for a second base station, transfers the received identification information to the second base station, and performs precoding of a data signal to be transmitted to the mobile terminal by collaborative transmission, by using the weight coefficient for the first base station identified by means of latest identification information. The second base station receives the identification information from the first base station, and performs precoding of a data signal to be transmitted by collaborative transmission, by using the weight coefficient for the second base station identified by means of identification information obtained as latest identification information and different from that for the weight coefficient for the first base station used for precoding of the data signal.

7 Claims, 15 Drawing Sheets

(56) References Cited

OTHER PUBLICATIONS

3rd Generation Partnership Project; Technical Specification Group Radio Access Network; "Evolved Universal Terrestrial Radio Access (E-UTRA); Physical Channels and Modulation"; 3GPP TS 36.211 V8.5.0 (Dec. 2008); Sophia Antipolis Valbonne, France.

3rd Generation Partnership Project; Technical Specification Group Radio Access Network; "Evolved Universal Terrestrial Radio Access (E-UTRA); Multiplexing and channel coding"; 3GPP TS 36.212 V8.5.0 (Dec. 2008); Sophia Antipolis Valbonne, France.

3rd Generation Partnership Project; Technical Specification Group Radio Access Network; "Evolved Universal Terrestrial Radio Access (E-UTRA); Physical layer procedures"; 3GPP TS 36.213 V8.5.0 (Dec. 2008); Sophia Antipolis Valbonne, France.

Fujitsu; "Pseudo Transmission Timing Control using Cyclic Shift for Downlink CoMP Joint Transmission"; 3GPP TSG-RAN1 #57; R1-091956; Agenda Item 15.2; San Francisco, CA; May 4-8, 2009.

Alcatel-Lucent; "Consideration of Backhaul Technology Evolution in Support of CoMP"; 3GPP TSG-RAN WG1 #58; R1-093344; Agenda Item 15-2; Shenzhen, China; Aug. 24-28, 2009.

Alcatel-Lucent Shanghai Bell, Alcatel-Lucent; "Efficient uplink coordinated multi-point reception with reduced backhauling cost"; 3GPP TSG RAN WG1 Meeting #58; R1-093345; Shenzhen, China; Aug. 24-28, 2009.

First Notification of Office Action issued for corresponding Chinese Patent Application No. 200980161846.0, issued on Jan. 6, 2014, with an English translation.

International preliminary report on patentability, with English translation, issued for corresponding International Patent Application No. PCT/JP2009/067571, mailed May 18, 2012.

Discussion on CoMP with Implicit CQI., Samsung, Discussion on CoMP with Implicit CQI Feedback, 3GPP TSG RAN WG1 Meeting #58bis, Miyazaki, Japan, Oct. 12-Oct. 16, 2009.

The extended European search report issued on Aug. 7, 2014 for corresponding European Patent Application No. 09850248.7.

\* cited by examiner

WIRELESS COMMUNICATION SYSTEM, MOBILE TERMINAL AND COLLABORATIVE COMMUNICATION METHOD

CROSS-REFERENCE TO RELATED APPLICATION

This is a continuation of Application PCT/JP2009/067571, filed on Oct. 8, 2009, now pending, the entire contents of which are incorporated herein by reference.

FIELD

The present invention relates to a wireless communication technique in which at least two base stations transmit data signals to a mobile terminal by collaborating with each other.

BACKGROUND

In the next-generation high-speed transmission communication such as LTE (Long Term Evolution), a technique called "precoding" is used. Precoding is a technique to improve the quality of signals received by a mobile terminal by multiplying signals to be transmitted from a plurality of transmitting antennas of base stations by weight coefficients in advance.

PATENT DOCUMENT

[Patent document 1] Japanese Patent Laid-Open No. 2008-109664

As a technique for improving the quality of signals received by a mobile terminal located at a cell end, a technique in which at least two base stations (transmitting stations) transmit data to one mobile terminal (receiving station) by collaborating with each other has been proposed. Such a technique is called cooperative (coordinated or collaborative) multiple-point transmission and reception, (hereinafter denoted as CoMP) in 3GPP (3rd Generation Partnership Project).

Also in CoMP, use of precoding used in LTE is conceivable.

SUMMARY

According to an aspect of the present invention, a wireless communication system in which at least a first base station and a second base station among a plurality of base stations transmit data signals to a mobile terminal by collaborating with each other,
the first base station including:
  a wireless receiving unit that receives from the mobile terminal identification information indicating a combination of a weight coefficient for the first base station and a weight coefficient for the second base station determined according to an estimated value of a propagation path condition between the first base station and the mobile terminal and an estimated value of a propagation path condition between the second base station and the mobile terminal;
  a transfer unit that transfers the identification information received by the wireless receiving unit to the second base station; and
  a first precoding unit that performs precoding of a data signal to be transmitted by collaborative transmission to the mobile terminal performed by the first base station and the second base station according to predetermined timing, by using the weight coefficient for the first base station identified by means of latest identification information in the identification information received by the wireless receiving unit, the second base station including:
  an information receiving unit that receives the identification information transferred from the first base station; and
  a second precoding unit that performs precoding of a data signal to be transmitted by collaborative transmission together with the data signal transmitted from the first base station according to the predetermined timing, by using the weight coefficient for the second base station identified by means of identification information obtained as latest identification information in the identification information received by the information receiving unit and different from that for the weight coefficient for the first base station used for precoding of the data signal to be transmitted by collaborative transmission according to the predetermined timing.

According to another aspect of the present invention, a wireless communication system in which at least a first base station and a second base station among a plurality of base stations transmit data signals to a mobile terminal by collaborating with each other,
the first base station including:
  a wireless receiving unit that receives from the mobile terminal identification information indicating a weight coefficient for the first base station determined according to an estimated value of a propagation path condition between the first base station and the mobile terminal and an estimated value of a propagation path condition between the second base station and the mobile terminal; and
  a first precoding unit that performs precoding of a data signal to be transmitted by collaborative transmission to the mobile terminal performed by the first base station and the second base station according to predetermined timing, by using the weight coefficient for the first base station identified by means of latest identification information in the identification information received by the wireless receiving unit,
the second base station including:
  a second precoding unit that performs precoding of the data signal to be transmitted by collaborative transmission together with the data signal transmitted from the first base station according to the predetermined timing, by using a weight coefficient for the second base station as a fixed value determined in advance.

In a further aspect, a collaborative communication method carried out with the above-described wireless communication system may be provided.

The object and advantage of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT(S)

Hereinafter, a mobile communication system as an embodiment will be described by giving specific examples. Each Embodiments given below is illustrative, and the present embodiment is not limited to a configuration of each Embodiments as follows.

[Embodiment 1]

Figure 1:
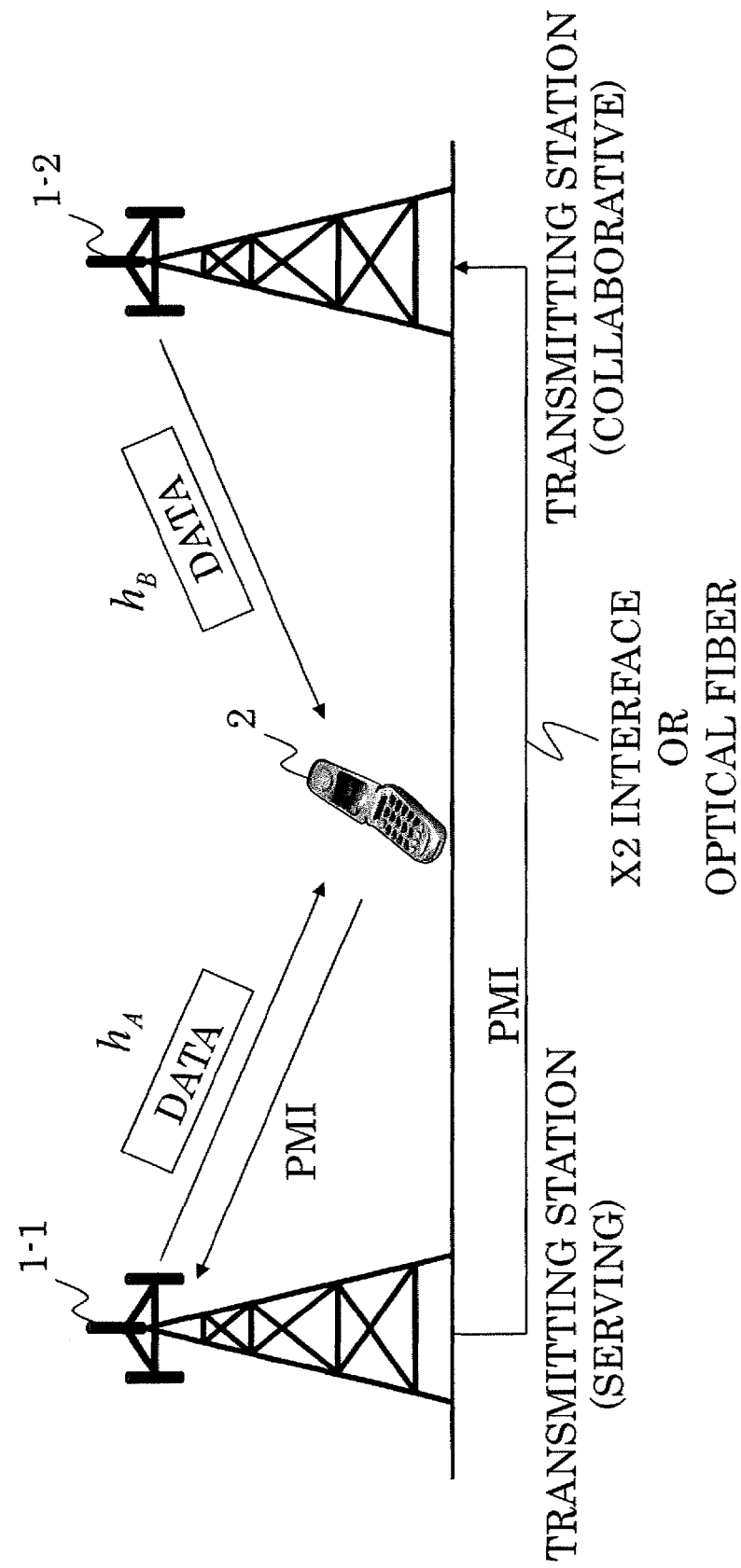
FIG. 1 is a diagram illustrating an example of a system configuration of a wireless communication system in Embodiment 1.

FIG. 1 is a diagram illustrating an example of a system configuration of a wireless communication system in Embodiment 1. As illustrated in FIG. 1, wireless communication system in Embodiment 1 includes a mobile terminal 2 and a plurality of base stations 1-1 and 1-2 capable of wireless communication. In some case, in the following description, the mobile terminal is referred to as "receiving station" and the base station is referred to as "transmitting station". In the wireless communication system in Embodiment 1, a CoMP technique is used to enable at least two base stations to transmit data to one mobile terminal by collaborating with each other.

"A plurality of base stations transmit data to one mobile terminal by collaborating with each other" is assumed to means, in the following description, that a plurality of base stations transmit data to one mobile terminal by the same transmission timing. Also, "the same transmission timing" signifies not only the very same timing but also similar, though not very same, timing.

In CoMP, an uplink is established between one of a plurality of transmitting stations collaborating with each other and a receiving station. A transmitting station that establishes an uplink between itself and a receiving station 2 is called a serving station or a serving eNB, for example (hereinafter denoted as "serving station"). A transmitting station other than the serving station, which transmits data to the receiving station, is called a collaborative station or a collaborative eNB, for example (hereinafter referred to as "collaborative station"). In the example illustrated in FIG. 1, a transmitting station 1-1 is a serving station, while a transmitting station 1-2 is a collaborative station. The transmitting stations 1-1 and 1-2 are connected to each other by wire connection through an X2 interface and an optical fiber, for example.

[Configuration of Mobile Terminal]

Figure 2:
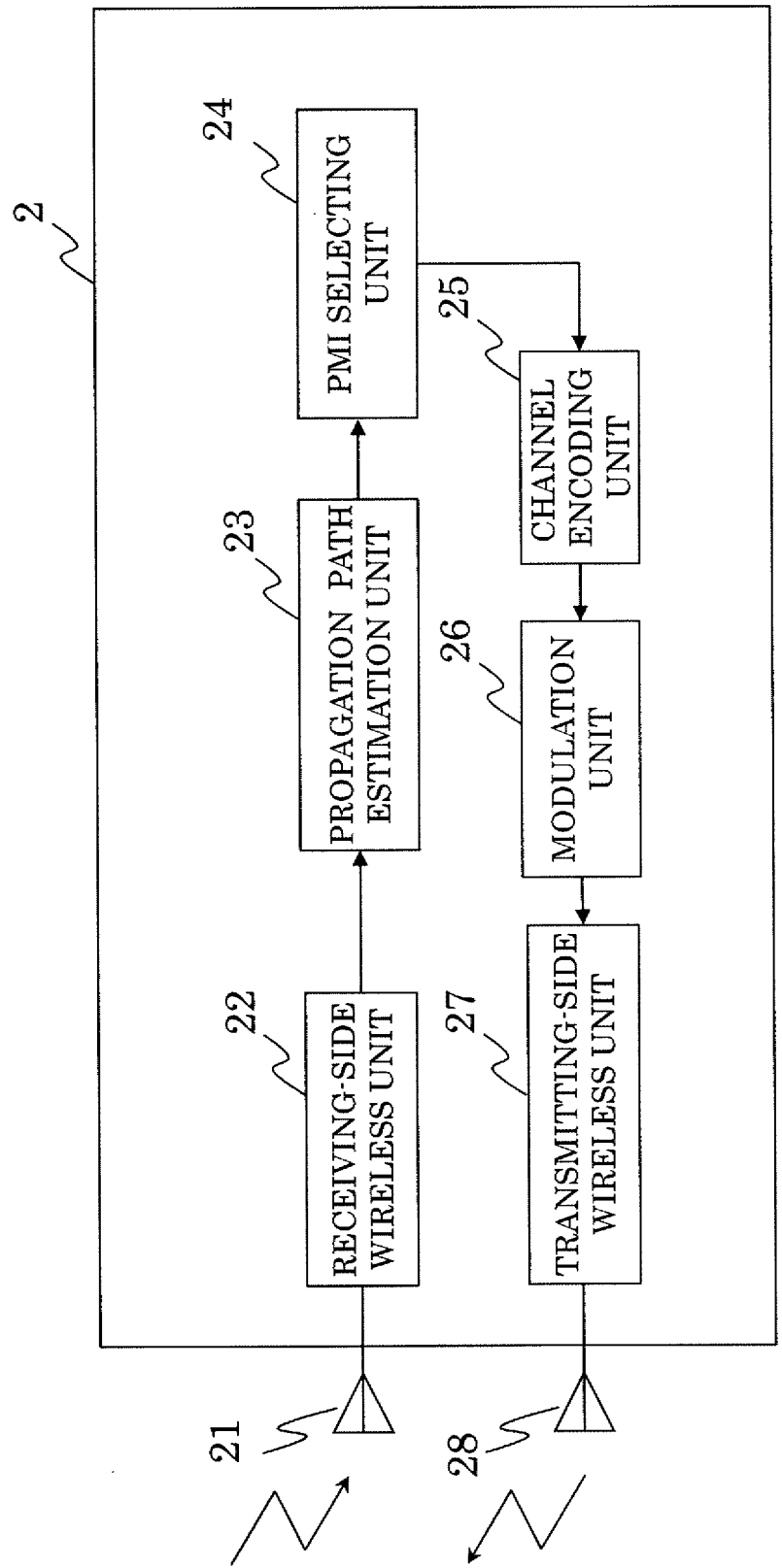
FIG. 2 is a diagram illustrating an example of a portion of a configuration of the mobile terminal.

FIG. 2 is a diagram illustrating an example of a portion of a configuration of the mobile terminal. The mobile terminal (receiving station) 2 includes, in a portion of its configuration, a receiving antenna 21, a receiving-side wireless unit 22, a propagation path estimation unit 23, a PMI selecting unit 24, a channel encoding unit 25, a modulation unit 26, a transmitting-side wireless unit 27 and a transmitting antenna 28. Each of these units is a software component, a hardware component or a combination of software and hardware components (see Section <Others>). Processing with each unit will be described below in a case where CoMP is used.

When a received signal is input through the receiving antenna 21, the receiving-side wireless unit 22 performs frequency conversion or the like on the received signal to produce a baseband signal and outputs this baseband signal to the propagation path estimation unit 23. In a case where CoMP is used, signals from the serving station 1-1 and the collaborative station 1-2 are received through the receiving antenna 21.

When receiving baseband signals from the receiving-side wireless unit 22, the propagation path estimation unit 23 obtains propagation path estimated values from pilot signals contained in the baseband signals. When CoMP is used, the propagation path estimation unit 23 estimates the states of propagation paths between the receiving antenna 21 of the receiving station 2 and the transmitting antennas of the transmitting stations 1-1 and 1-2 based on the signals transmitted from the serving station 1-1 and the collaborative station 1-2. The state of a propagation path changes momently depending on the frequency band used, the signal path, etc. The propagation path estimation unit 23 obtains propagation path estimated values at predetermined time intervals. The propagation path estimated value of the propagation path between the receiving antenna 21 and the serving station 1-1 is denoted as "propagation path estimated value $h_A$", while the propagation path estimated value of the propagation path between the receiving antenna 21 and the collaborative station 1-2 is denoted as "propagation path estimated value $h_B$". The propagation path estimation unit 23 outputs the propagation path estimated values $h_A$ and $h_B$ obtained by estimation to the PMI selecting unit 24. Any of well-known propagation path estimation methods may be used by the propagation path estimation unit 23.

The PMI selecting unit 24 obtains as inputs the propagation path estimated values from the propagation path estimation unit 23. The PMI selecting unit 24 determines a weight coefficient $w_A$ to be used in the serving station 1-1 and a weight coefficient $w_B$ to be used in the collaborative station 1-2 based on the propagation path estimated values $h_A$ and $h_B$. Weight coefficients $w_A$ and $w_B$ determination processing performed by the PMI selecting unit 24 is as described below.

In a case where the serving station 1-1 and the collaborative station 1-2 transmit data d to the receiving station 2 by collaborating with each other, the received signal received by the receiving station 2 at time t is expressed by (Expression 1)

below using propagation path estimated values $h_A(t)$ and $h_B(t)$, weight coefficients $w_A(t)$ and $w_B(t)$. In (Expression 1), n represents a noise signal.

$$\text{Received signal } h_A(t)w_A(t)d + h_B(t)w_B(t)\, d + n \quad \text{(Expression 1)}$$

SNR (Signal to Noise Ratio) of the received signal is expressed by (Expression 2) below. In (Expression 2), $\sigma^2$ represents noise power.

$$\text{SNR of received signal } \frac{|h_A(t)w_A(t) + h_B(t)w_B(t)|^2}{\sigma^2} \quad \text{(Expression 2)}$$

The PMI selecting unit 24 determines the weight coefficients $w_A(t)$ and $w_B(t)$ so that the quality of the received signal is improved, that is, the SNR is maximum. As expressed in (Expression 2) above, maximizing the numerator in (Expression 2) suffices for maximizing the SNR. Therefore, the PMI selecting unit 24 determines the weight coefficients with which the numerator of (Expression 2) is maximizing.

The PMI selecting unit 24 holds a table indicating correspondence between precoding matrices (hereinafter denoted as "PM") representing combinations of the weight coefficients $w_A(t)$ and $w_B(t)$ and precoding matrix indicators (hereinafter denoted as "PMI") for identifying the PMs. This correspondence table is denoted as "code book" below.

Figure 3:
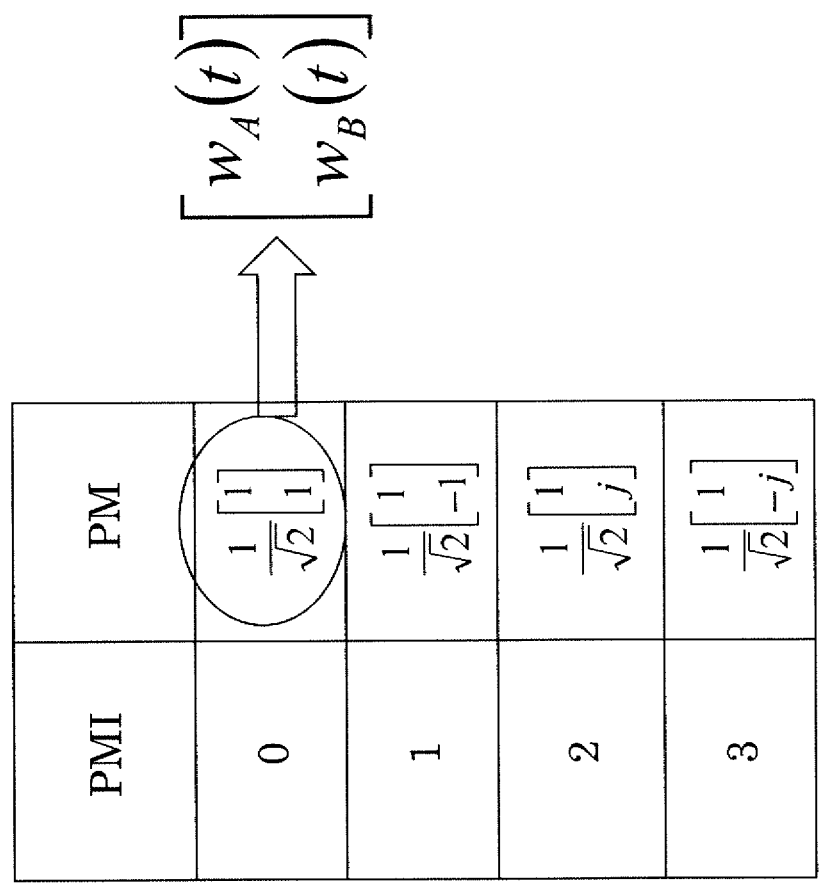
FIG. 3 is a diagram illustrating an example of the code book in Embodiment 1.

FIG. 3 is a diagram illustrating an example of the code book in Embodiment 1. In the code book illustrated in FIG. 3, the first element in each PM, for example, represents the weight coefficient $w_A(t)$, while the second element in the PM represents the weight coefficient $w_B(t)$. The PMI selecting unit 24 determines from this code book one of the combinations of the weight coefficients $w_A(t)$ and $w_B(t)$, i.e., one of the PMs, with which the numerator in (Expression 2) above is maximum, and selects the PMI corresponding to this PM. The PMI selecting unit 24 outputs to the channel encoding unit 25 the selected PMI as a PMI notice value addressed to the serving station 1-1.

When receiving the PMI notice value from the PMI selecting unit 24, the channel encoding unit 25 encodes the data including the PMI notice value by a predetermined encoding method. The channel encoding unit 25 outputs the encoded data to the modulation unit 26.

The modulation unit 26 modulates the encoded data sent from the channel encoding unit 25 by a predetermined modulation method and outputs the modulated data to the transmitting-side wireless unit 27. When the modulated data from the modulation unit 26 is input to the transmitting-side wireless unit 27, the transmitting-side wireless unit 27 converts the input data into a radiofrequency signal and outputs the radiofrequency signal to the transmitting antenna 28. The radiofrequency signal is transmitted by means of the transmitting antenna 28 to the serving station 1-1 to which the data is addressed.

[Configuration of Base Station]

Figure 4:
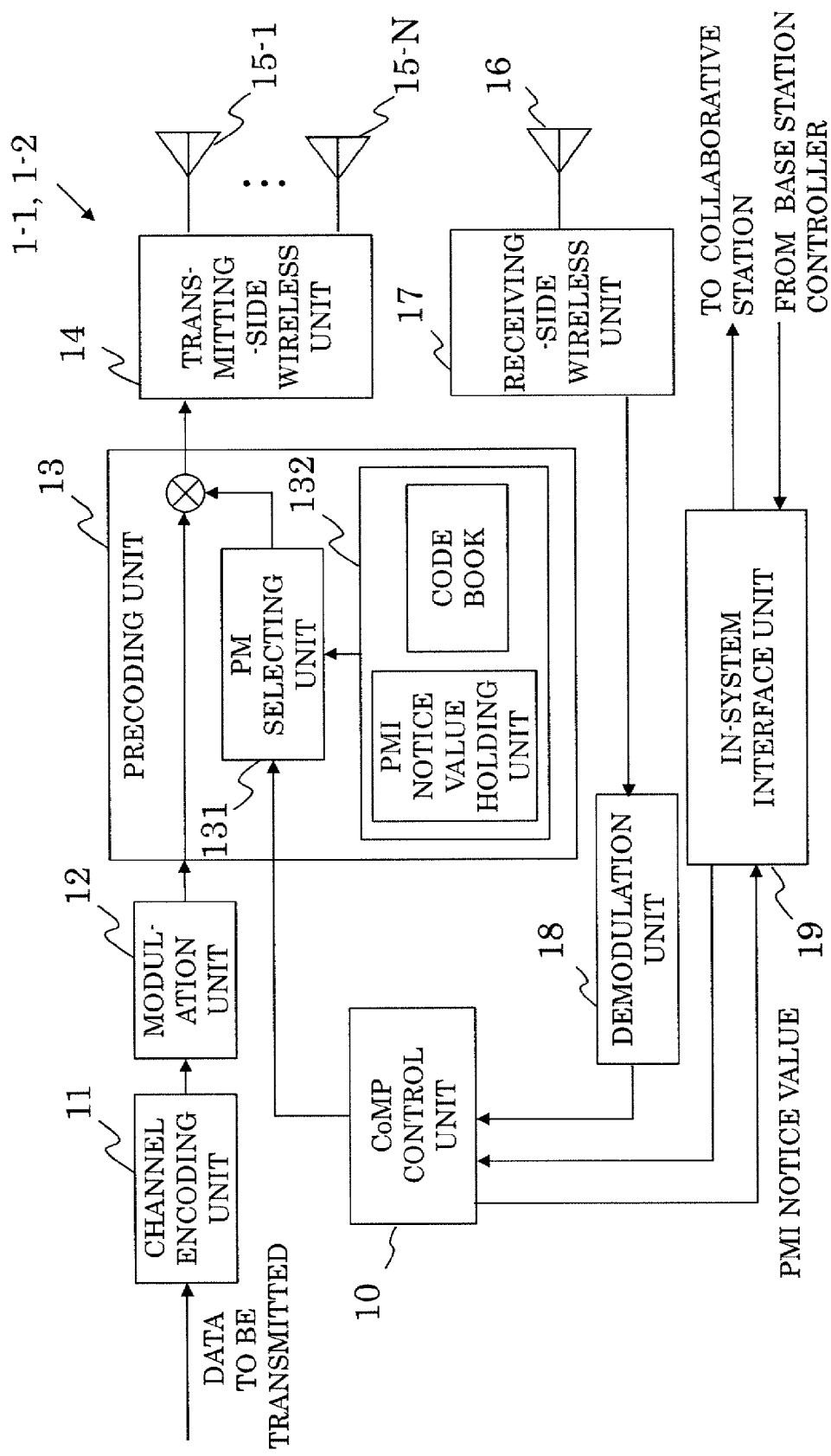
FIG. 4 is a diagram illustrating an example of a portion of a configuration of the base station 1-1 as the serving station.

FIG. 4 is a diagram illustrating an example of a portion of a configuration of the base station 1-1 as the serving station. The serving station 1-1 includes, in a portion of its configuration, a channel encoding unit 11, a modulation unit 12, a precoding unit 13, a transmitting-side wireless unit 14, transmitting antennas 15-1 to 15-N (N: a natural number, exclusive of zero), a receiving antenna 16, a receiving-side wireless unit 17, a demodulation unit 18, an in-system interface control unit 19, a CoMP control unit 10. Each of these units is a software component, a hardware component or a combination of software and hardware components (see Section <Others>).

When the channel encoding unit 11 receives from one of other processing units (not illustrated) data to be transmitted the receiving station 2 to which the data is addressed, it encodes the data to be transmitted by a predetermined encoding method. The channel encoding unit 11 outputs the encoded data series to the modulation unit 12.

When receiving the encoded data series, the modulation unit 12 modulates the data series by a predetermined modulation method. The modulation unit 12 outputs the modulated data series to the precoding unit 13.

The precoding unit 13 determines a weight coefficient to be applied to the sequence of modulated data and performs precoding of the sequence of modulated data by using this weight coefficient. The precoding unit 13 sends to the transmitting-side wireless unit 14 this data signal produced by precoding. A method of determining a weight coefficient with the precoding unit 13 will be described later.

When receiving the data signal from the precoding unit 13, the transmitting-side wireless unit 14 converts the data signal into a radiofrequency signal and sends this radiofrequency signal to some of the transmitting antennas 15-1 to 15-N assigned for the receiving station 2. In Embodiment 1, a wireless signal is transmitted from one of the transmitting antennas to the receiving station 2.

Through the receiving antenna 16, a signal transmitted from the receiving station 2 is received. The receiving-side wireless unit 17 performs processing including frequency conversion to produce a baseband signal and sends the baseband signal to the demodulation unit 18.

The demodulation unit 18 obtains received data by demodulating the baseband signal. The demodulation unit 18 sends to the CoMP control unit 10 the received data obtained in this way. This received data contains a PMI notice value notified from the receiving station 2. In the present embodiment, a method of transmission of a PMI notice value from the receiving station 2 to the serving station 1-1 is not restrictively specified. Therefore the description of such a method is not made here.

The in-system interface control unit 19 controls communication between the collaborative station 1-2 and at least one of the devices in the system such as a base station controller (not illustrated). This in-system interface includes an X2 interface. The in-system interface control unit 19 receives the PMI notice value transferred from the CoMP control unit 10 and transfers the PMI notice value to the collaborative station 1-2. When the in-system interface control unit 19 receives a command to start or stop CoMP or a designation of this station as a serving station or the like from the base station controller (not illustrated), it sends this information to the CoMP control unit 10. The serving station 1-1 may alternatively determine by itself commands including a start of CoMP, a stop of CoMP, or a designation of the station as a serving station.

The CoMP control unit 10 manages information including information about the receiving station 2 for which CoMP is used, the PMI notice value from the receiving station 2 and information as to whether this station is a serving station or a collaborative station based on the received data sent from the demodulation unit 18 and the information sent from the in-system interface control unit 19. When receiving the PMI notice value, the CoMP control unit 10 sends to the precoding unit 13, with the PMI notice value, a used element number in the PM identified according to the PMI notice value and information about the receiving station 2 being a source of the PMI. At this time, the CoMP control unit 10 sends the PMI notice value, with the element numbers to be used in the collaborative station and information about the receiving station 2, to the collaborative station 1-2 through the in-system interface control unit 19.

The above-described precoding unit 13 includes a PM selecting unit 131, a PMI notice value holding unit 132 and a code book 133. The code book 133 and the code book which the receiving station 2 has (the above-described example illustrated in FIG. 3) have contents in common with each other. The PMI notice value holding unit 132 holds the PMI notice value sent from the CoMP control unit 10 together with information including information for identifying the receiving station 2 as the source of the PMI notice value.

The PM selecting unit 131 reads out, from the PM corresponding to the latest PMI notice value in PMI notice values held in the PMI notice value holding unit 132, the weight coefficient associated with the used element number sent from the CoMP control unit 10. The weight coefficient read out is used for precoding of data to be transmitted to the receiving station 2 being the source of the PMI notice value.

The configuration of the transmitting station 1-1 as a serving station is as described above. The transmitting station 1-2 as a collaborative station also has basically the same configuration as that of the transmitting station 1-1 illustrated in FIG. 4. The collaborative station 1-2 differs from the serving station 1-1 in that it does not directly receive a PMI notice value from the receiving station 2 but receives the PMI notice value from the serving station 1-1, and in that no wireless link is established between the collaborative station 1-2 and the receiving station 2 for which CoMP is used.

[PM Selecting Operation]

Thus, the serving station 1-1 selects a weight coefficient based on a PMI notice value wirelessly transmitted from the receiving station 2, while the collaborative station 1-2 selects a weight coefficient based on the PMI notice value transferred from the serving station 1-1. In the case where data to be transmitted to the receiving station 2 is transmitted by the serving station 1-1 and the collaborative station 1-2 collaborating with each other, therefore, PMI notice values that have been delivered to the serving station 1-1 and the collaborative station 1-2 at a certain point in time are out of alignment with each other.

Figure 5:
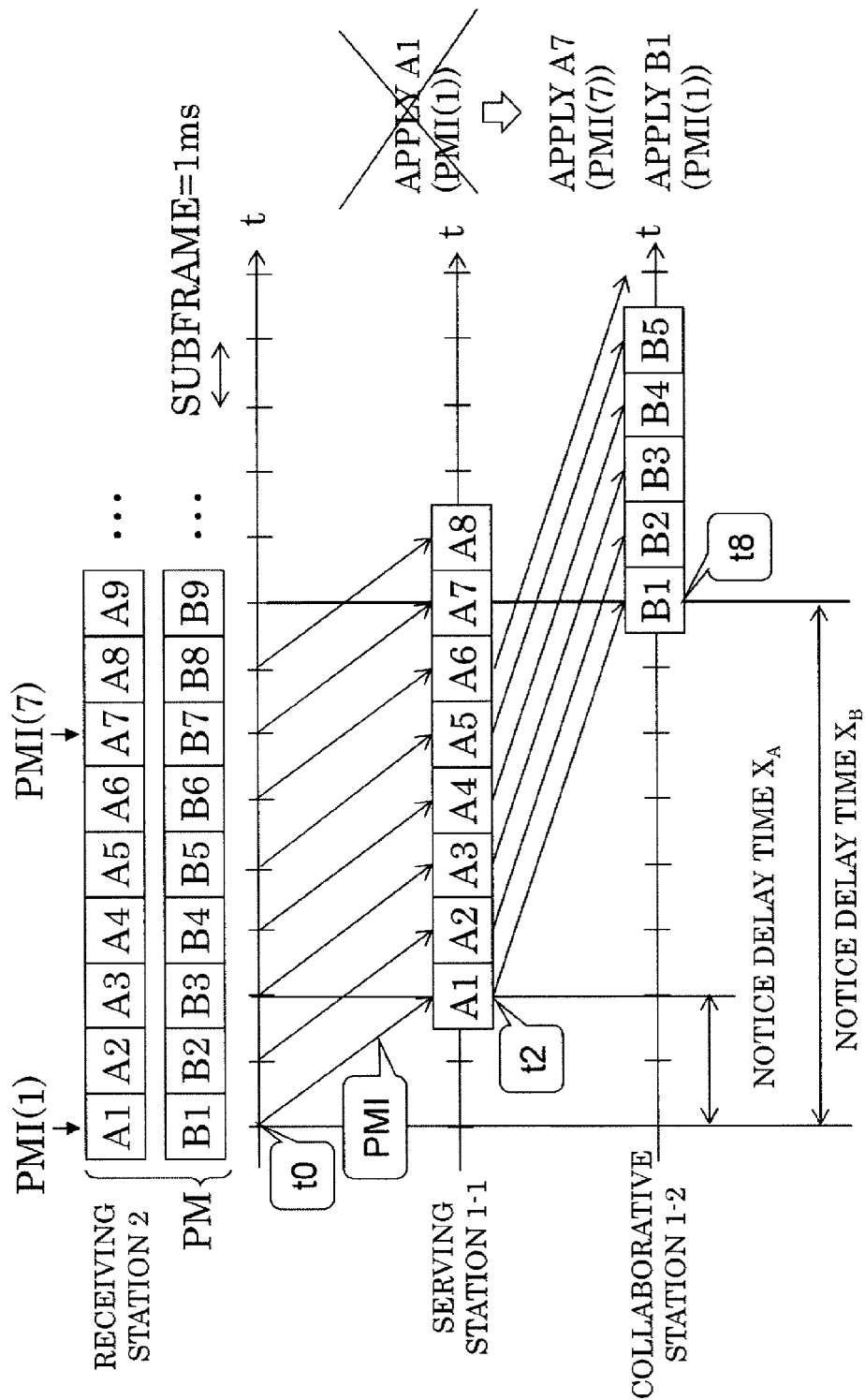
FIG. 5 is a diagram illustrating an example of the relationship between times at which weight coefficients based on PMI notice values from the receiving station 2 are applied to data to be transmitted in the serving station 1-1 and the collaborative station 1-2.

FIG. 5 is a diagram illustrating an example of the relationship between times at which weight coefficients based on PMI notice values from the receiving station 2 are applied to data to be transmitted in the serving station 1-1 and the collaborative station 1-2. In FIG. 5, the abscissa represents time t, and an example of notification of the serving station 1-1 of PMI notice values at intervals of 1 millimeter/second (ms) from the receiving station 2 is illustrated.

In the receiving station 2, the PMI selecting unit 24 makes a selection from PMs based on the propagation path estimated values $h_A$ and $h_B$ estimated based on pilot signals from the serving station 1-1 and the collaborative station 1-2. The PM selected at this time represents a combination of weight coefficients with which the SNR of the received signal in the receiving station 2 is maximum. The weight coefficients contained in the PM are one applied to data to be transmitted to the receiving station 2 in the serving station 1-1 and one applied to data to be transmitted to the receiving station 2 in the collaborative station 1-2. FIG. 5 illustrates selection of the PM containing weight coefficients A1 and B1 at time t0 by way of example. The receiving station 2 transmits PMI(1) for identifying this PM as a PMI notice value to the serving station 1-1.

In the serving station 1-1, the CoMP control unit 10 receives PMI(1) and the precoding unit 13 performs precoding of a data signal to be sent to the receiving station 2 by using the weight coefficient A1 extracted from the predetermined element in the PM identified by means of PMI(1). In the example illustrated in FIG. 5, at time t2, the signal precoded with the weight coefficient A1 is transmitted from the serving station 1-1.

On the other hand, the PMI(1) is transferred from the serving station 1-1 to the collaborative station 1-2 through the in-system interface control unit 19. The collaborative station 1-2 then performs precoding of a data signal to be sent to the receiving station 2 by using the weight coefficient B1 extracted from the predetermined element in the PM identified by means of the PMI(1), as does the serving station 1-1. In the example illustrated in FIG. 5, at time t8, the signal precoded with the weight coefficient B1 is transmitted from the collaborative station 1-2.

Thus, time lags of time t2 and time t8 occur before application of the PMI(1) selected at time t0 to precodings in the serving station 1-1 and the collaborative station 1-2. The time period from the time at which the receiving station 2 transmits PMI(1) to the time at which the serving station 1-1 transmits a signal to which the PMI(1) is applied is hereinafter denoted as notice delay time $X_A$, and the time period from the time at which the receiving station 2 transmits PMI(1) to the time at which the collaborative station 1-2 transmits a signal to which the PMI(1) is applied is hereinafter denoted as notice delay time $X_B$. A communication delay between the transmitting stations is, for example, about 40 (ms). Therefore the communication delay between the transmitting stations is dominant in the notice delay time $X_B$. In FIG. 5, notice delay time $X_A$=2 ms with respect to the serving station 1-1 and notice delay time $X_B$=8 ms with respect to the collaborative station 1-2 are indicated for ease of description.

Since the latest propagation environment is reflected in a PMI selected in the receiving station 2, it is preferable that the time period from the completion of determination of the PMI to transmission of a signal precoded with the PMI be shorter. This is because the propagation environment changes momently. However, the time period taken to deliver the PMI notified from the receiving station 2 to the collaborative station 1-2 includes the communication delay between the transmitting stations, as described above, and there is, therefore, a possibility of the correlation between the propagation environment at the time of determination of the PMI and the propagation environment when the PMI is delivered to the collaborative station 1-2 being reduced.

Since a PMI notice value is a value for identifying a certain PM, it is desirable that the elements of the PM be respectively applied at a certain point in time to precodings of data signals to be transmitted to one receiving station 2. This is because the PM is determined as a combination of weight coefficients with which the SNR of the received signal in the receiving station 2 is maximum, as described above. Therefore, at time t8 in the example illustrated in FIG. 5, using the weight coefficient B1 identified by means of the PMI(1) in which the latest propagation environment is reflected in the collaborative station 1-2 and the weight coefficient A1 identified by means of the same PMI(1) in the serving station 1-1 is considered.

However, values from PMI(1) to PMI(7) are notified to the serving station 1-1 at time t8. For the serving station 1-1, therefore, the PMI notice value in which the latest propagation environment is reflected is PMI(7). Then, in the serving station 1-1 in Embodiment 1, the weight coefficient A7 identified by means of PMI(7) in which the latest propagation environment is reflected is used. Thus, in Embodiment 1, elements of PMs identified by means of different PMIs are used for precodings in the serving station 1-1 and the collaborative station 1-2 of groups of data to be transmitted by collaborative transmission.

The serving station 1-1 is thus enabled to perform precoding by using the weight coefficient in which the latest propagation environment is reflected, while the weight coefficients to be used in the serving station 1-1 and the collaborative station 1-2 are not determined as a most suitable combination. As a result, the quality of receiving at the receiving station 2 of the signal transmitted from the serving station 1-1 can be improved in comparison with the case where weight coefficients identified by means of one PMI are used in the serving station 1-1 and the collaborative station 1-2.

According to the above-described aspects, a wireless communication technique that improves the quality of receiving at a mobile terminal when at least two base stations transmit data signals to one mobile terminal by collaborating with each other can be provided.

[Supplementary to Embodiment 1]

In the above description of Embodiment 1, the number of transmitting antennas used for CoMP in the serving station 1-1 and the collaborative station 1-2 is not mentioned. However, each of the serving station 1-1 and the collaborative station 1-2 may execute CoMP by using a plurality of transmitting antennas.

The number of transmitting antennas used for data transmission from the serving station 1-1 to the receiving station 2 is expressed as $N_{tA}$ (a natural number, exclusive of zero), and the number of transmitting antennas used for data transmission from the collaborative station 1-2 to the receiving station 2 is expressed as $N_{tB}$ (a natural number, exclusive of zero). In this case, propagation path estimated values and weight coefficients with respect to the serving station 1-1 and the collaborative station 1-2 can be expressed in vector form, as described below.

eNA#A propagation path estimated value $h_A{}^T = [h_{A,1} h_{A,2} \ldots h_{A,N_{tA}}]$ eNA#A weight coefficient $w_A{}^T = [w_{A,1} w_{A,2} \ldots w_{A,N_{tA}}]$ eNA#B propagation path estimated value $h_B{}^T = [h_{B,1} h_{B,2} \ldots h_{B,N_{tB}}]$ eNA#B weight coefficient $w_B{}^T = [w_{B,1} w_{B,2} \ldots W_{A,N_{tB}}]$ A received signal received by the receiving station 2 at time t is expressed by (Expression 3) below.

Received signal $\{h_A{}^T(t)w_A(t) + h_B{}^T(t)w_B(t)\}d + n$ (Expression 3)

The receiving station 2 may select from the code book a PM with which the SNR of the received signal is maximum, and therefore selects a PM such that the value of (Expression 4) below is maximum.

$|h_A{}^T(t)w_A(t) + h_B{}^T(t)w_B(t)|^2$ (Expression 4)

Thus, even in a case where a plurality of transmitting antennas are used in each of the serving station 1-1 and the collaborative station 1-2, precoding in Embodiment 1 can be executed. Assignment as to which element in a PM does each transmitting station use may be determined in advance in the system, notified from the base station controller (not illustrated) or the like, determined by the serving station 1-1 or notified from the receiving station 2.

[Embodiment 2]

In a wireless communication system in Embodiment 2, CoMP in which three or more transmitting stations transmit data signals to one receiving station by collaborating with each other is executed. Description will be made below by avoiding overlaps on the description of Embodiment 1.

Figure 6:
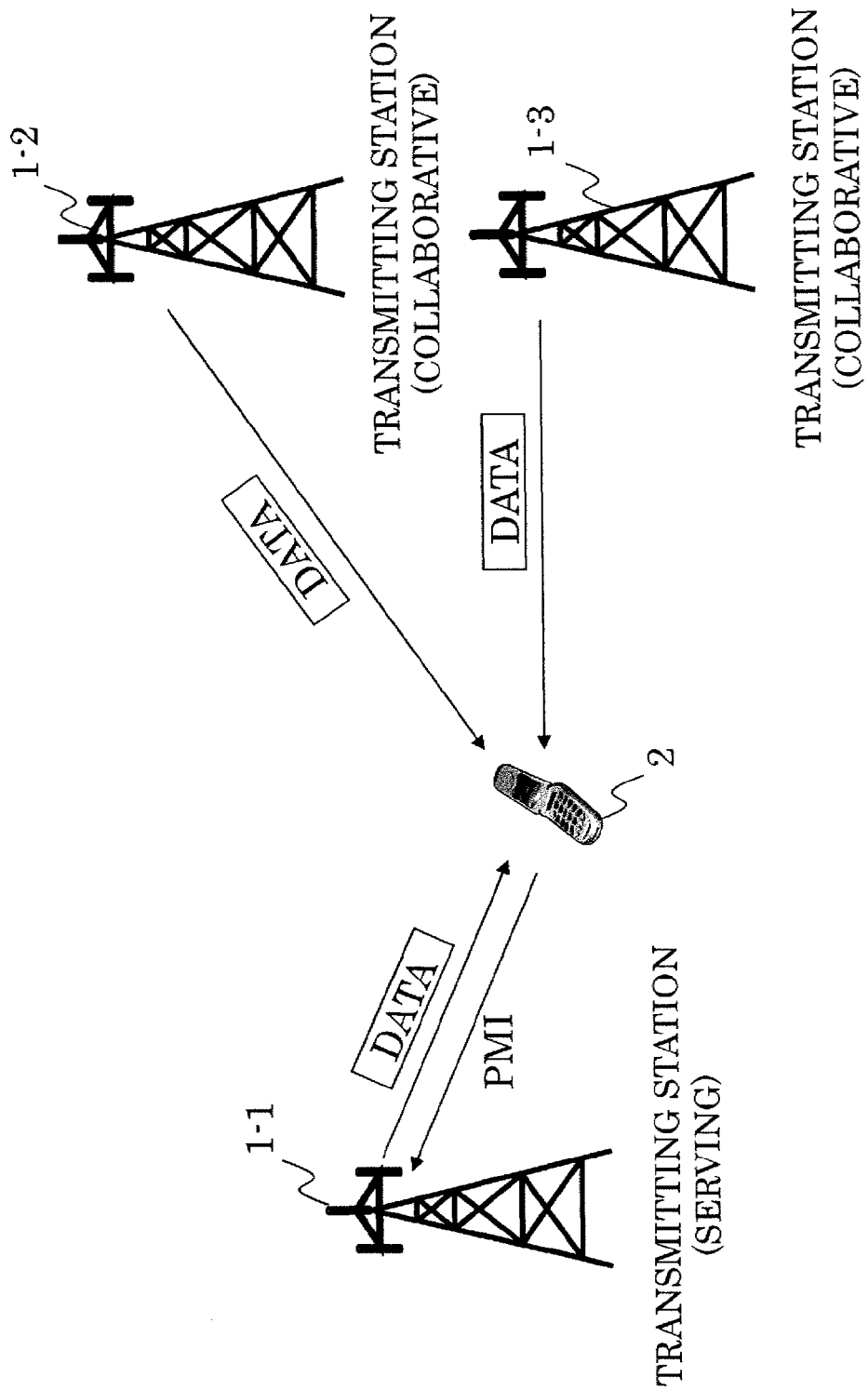
FIG. 6 is a diagram illustrating an example of a system configuration of a wireless communication system in Embodiment 2.

FIG. 6 is a diagram illustrating an example of a system configuration of a wireless communication system in Embodiment 2. The wireless communication system in Embodiment 2 includes a base stations 1-1, 1-2, and 1-3. In the example illustrated in FIG. 6, the transmitting station 1-1 is a serving station, while the transmitting stations 1-2 and 1-3 are collaborative stations. Each transmitting station is communicably connected. The transmitting stations 1-1, 1-2, and 1-3 and a receiving station 2 in Embodiment 2 have the same configurations as those in Embodiment 1. Description will be made below of the units that execute processings different from those in Embodiment 1.

In the receiving station 2, the propagation path estimation unit 23 obtains propagation path estimated values $h_A$, $h_B$, and $h_C$ from pilot signals from the serving station 1-1 and the collaborative stations 1-2 and 1-3. Vectors $w_A$, $w_B$, and $w_C$ respectively represent weight coefficients used for signals to be transmitted through the transmitting antennas of the serving station 1-1 and the collaborative stations 1-2 and 1-3 in this case. If the same data d is transmitted from the serving station 1-1 and the collaborative stations 1-2 and 1-3, a received signal received by the receiving station 2 can be expressed by (Expression 5) below. Also, the SNR of the received signal in the receiving station 2 can be expressed by (Expression 6) below.

Received signal in MS $h_A^T w_A d + h_B^T w_B d + h_C^T w_C d + n =$ (Expression 5)
$(h_A^T w_A + h_B^T w_B + h_C^T w_C)d + n$ SNR of received signal $\dfrac{|h_A^T w_A + h_B^T w_B + h_C^T w_C|^2}{\sigma^2}$ (Expression 6)

The PMI selecting unit 24 in the receiving station 2 selects, from the code book, by using the propagation path estimated values $h_A$, $h_B$, and $h_C$, a combination (PM) of weight coefficients with which the value of (Expression 6) above is maximum. In the numbers of transmitting antennas of the serving station 1-1 and the collaborative stations 1-2 and 1-3 are $N_{tA}$, $N_{tB}$, and $N_{tC}$, PMs in Embodiment 2 have a size of $(N_{tA} + N_{tB} + N_{tC}) \times 1$.

The receiving station 2 transmits to the serving station 1-1 a PMI notice value for identifying the PM selected in this way. The serving station 1-1 receiving this PMI notice value transfers the received PMI notice value to the collaborative stations 1-2 and 1-3.

[PM Selecting Operation]

Figure 7:
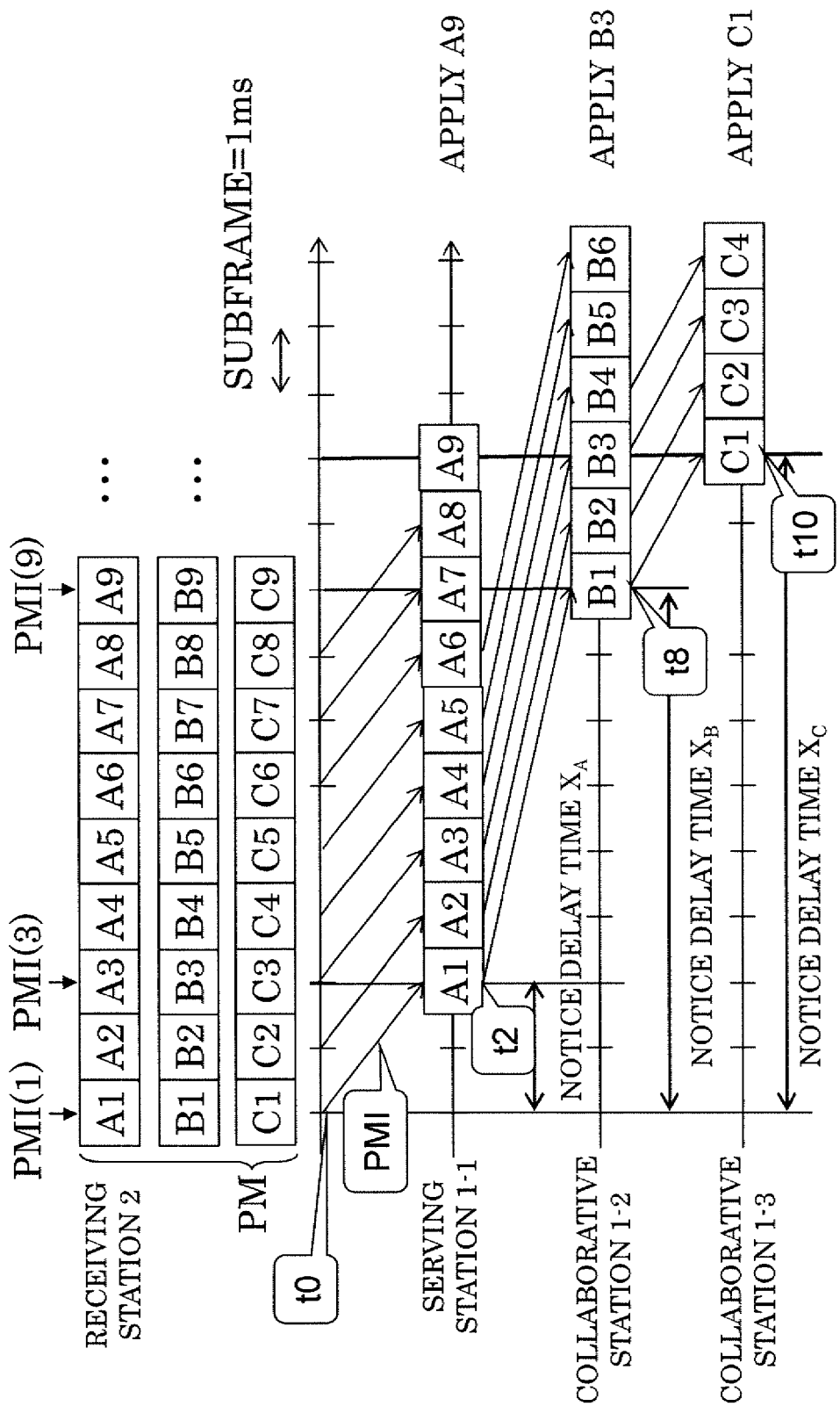
FIG. 7 is a diagram illustrating an example of the relationship between times at which weight coefficients are applied to data to be transmitted in the serving station 1-1 and the collaborative stations 1-2 and 1-3 in Embodiment 2.

FIG. 7 is a diagram illustrating an example of the relationship between times at which weight coefficients are applied to data to be transmitted in the serving station 1-1 and the collaborative stations 1-2 and 1-3 in Embodiment 2. In FIG. 7, the abscissa represents time t, and an example of notification of the serving station 1-1 of PMI notice values at intervals of 1 millimeter/second (ms) from the receiving station 2 is illustrated.

In the receiving station 2, the PMI selecting unit 24 makes a selection from PMs based on the propagation path estimated values $h_A$, $h_B$, and $h_C$ estimated based on pilot signals from the serving station 1-1 and the collaborative stations 1-2 and 1-3. It is assumed that the PM containing weight coefficients A1, B1, and C1 is selected at time t0. The receiving station 2 transmits PMI(1) for identifying this PM to the serving station 1-1.

In the serving station 1-1, the CoMP control unit 10 receives PMI(1) and the precoding unit 13 performs precoding of a data signal to be sent to the receiving station 2 by using the weight coefficient A1 extracted from the predetermined element in the PM identified by means of PMI(1). In the example illustrated in FIG. 7, the signal precoded with the weight coefficient A1 is transmitted from the serving station 1-1 at time t2.

On the other hand, the PMI(1) is transmitted from the serving station 1-1 to the collaborative stations 1-2 and 1-3 through the in-system interface control unit 19. A signal precoded with the weight coefficient B1 extracted from the PMI (1) is transmitted from the collaborative station 1-2 at time t8. Also, a signal precoded with the weight coefficient C1 extracted from the PMI(1) is transmitted from the collaborative station 1-2 at time t10.

Thus, time lags of time t2, time t8 and time t10 occur before application of the PMI(1) selected at time t0 to precodings in the serving station 1-1 and the collaborative stations 1-2 and 1-3. The time period from the time at which the receiving station 2 transmits PMI(1) to the time at which the serving station 1-1 transmits a signal to which the PMI(1) is applied is hereinafter denoted as notice delay time $X_A$; the time period from the time at which the receiving station 2 transmits PMI (1) to the time at which the collaborative station 1-2 transmits a signal to which the PMI(1) is applied is hereinafter denoted as notice delay time $X_B$; and the time period from the time at which the receiving station 2 transmits PMI(1) to the time at which the collaborative station 1-3 transmits a signal to which the PMI(1) is applied is hereinafter denoted as notice delay time $X_C$. In FIG. 7, notice delay time $X_A$=2 ms with respect to the serving station 1-1, notice delay time $X_B$=8 ms with respect to the collaborative station 1-2 and notice delay time $X_C$=10 ms are indicated for ease of description.

In the wireless communication system in Embodiment 2, a plurality of collaborative stations exist and the time periods taken to deliver the PMI notice value from the serving station 1-1 to the collaborative stations are different from each other. Each of the time periods taken to deliver the PMI notified from the receiving station 2 to the collaborative stations 1-2 and 1-3 includes the communication delay between the transmitting stations, and there is, therefore, a possibility of the correlation between the propagation environment at the time of determination of the PMI and the propagation environment when the signal to which the weight coefficient corresponding to the PMI is transmitted being reduced.

The PMI(1) in which the latest propagation environment is reflected for the collaborative station 1-3 to which the PMI notice value is last delivered is used at time t10 in the collaborative station 1-3. On the other hand, PMI notice values from PMI(1) to PMI(9) have been received by the serving station 1-1 at time t10, and PMI notice values from PMI(1) to PMI(3) have been received by the collaborative station 1-2. Then, the serving station 1-1 in Embodiment 2 performs precoding by using the PMI notice value PMI(9) at time t10, and the collaborative station 1-2 performs precoding by using the PMI notice value PMI(3) at time t10.

Each transmitting station is thus enabled to perform precoding by using the weight coefficient in which the latest propagation environment is reflected, while the weight coefficients to be used in the serving station 1-1 and the collaborative stations 1-2 and 1-3 are not determined as a most suitable combination. As a result, at least the quality of receiving at the receiving station 2 of the signal transmitted from the serving station 1-1 and the collaborative station 1-2 can be improved in comparison with the case where weight coefficients identified by means of one PMI are used in the serving station 1-1 and the collaborative stations 1-2 and 1-3.

According to a wireless communication system in Embodiment 2, the quality of receiving at the receiving station 2 can be improved as in Embodiment 1 described above even in a case where the number of transmitting stations to which CoMP is applied is three or more.

[Embodiment 3]

In Embodiment 3, a wireless communication system in which CoMP can be applied to two transmitting stations 1-1 and 1-2 with respect to one receiving station 2 is implemented. In Embodiment 1, different elements in a PM are used for precoding in the serving station 1-1 and the collaborative station 1-2 of data signals to be transmitted by collaborative transmission. As a result, weight coefficients to be respectively used in the serving station 1-1 and the collaborative station 1-2 are not values determined as a most suitable combination but values respectively determined by different timings in the receiving station 2. In Embodiment 3, weight coefficients to be respectively used in the serving station 1-1 and the collaborative station 1-2 by certain timings are determined so as to have a certain correlation.

Figure 8:
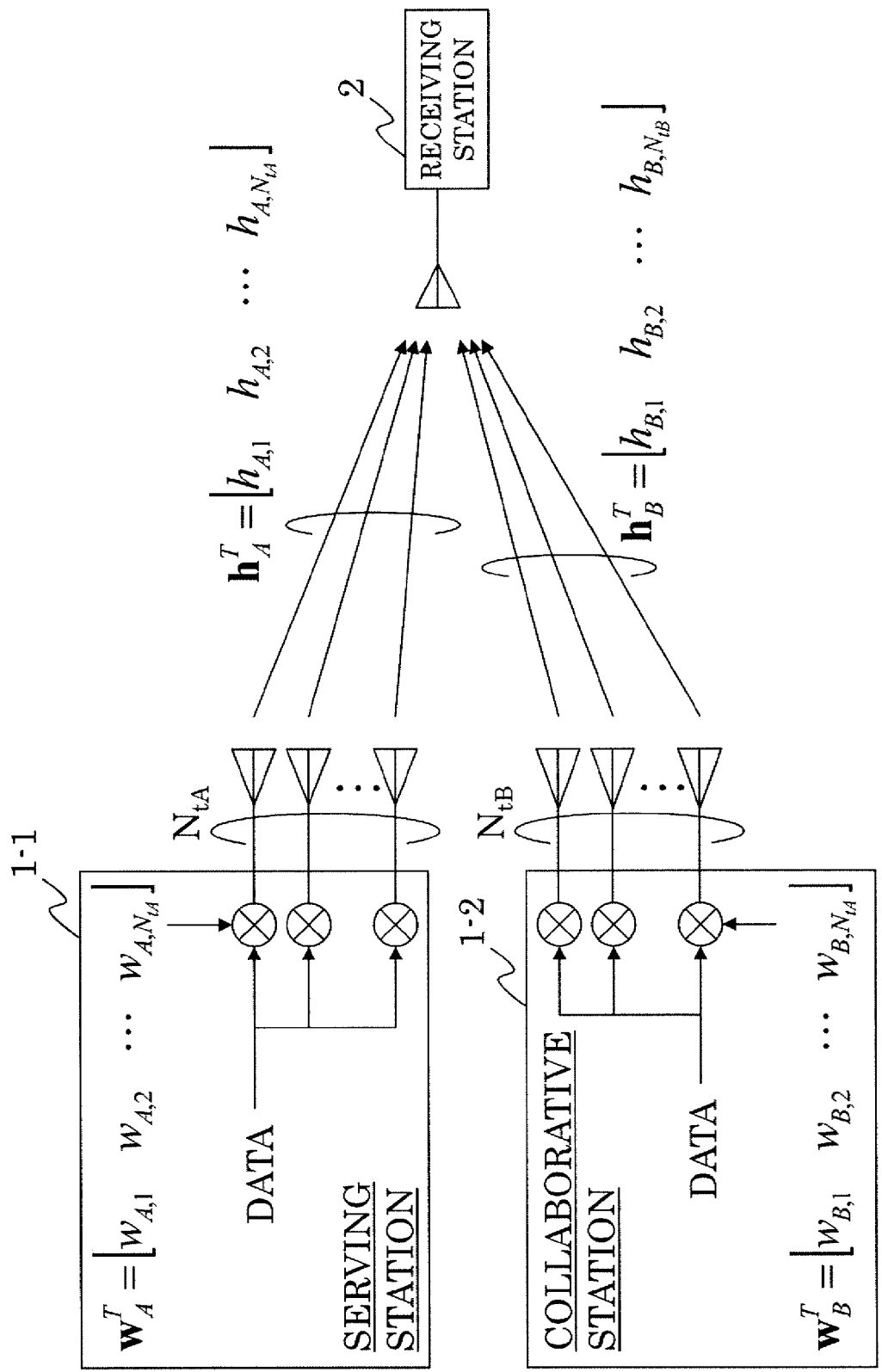
FIG. 8 is a diagram illustrating an example of a configuration of a wireless communication system in Embodiment 3.

FIG. 8 is a diagram illustrating an example of a configuration of a wireless communication system in Embodiment 3. The wireless communication system in Embodiment 3 has the same configuration as that in Embodiment 1. However, as illustrated in FIG. 8, for sending data to the receiving station 2 which is a application target of CoMP, the serving station 1-1 uses $N_{tA}$ number ($N_{tA}$: a natural number, exclusive of zero) of transmitting antennas and the collaborative station 1-2 uses $N_{tB}$ number ($N_{tB}$: a natural number, exclusive of zero) of transmitting antennas. The transmitting stations 1-1 and 1-2 in Embodiment 3 have the same configuration as that in Embodiment 1. The configuration of the receiving station 2 in Embodiment 3 differs from that in Embodiment 1.

Figure 9:
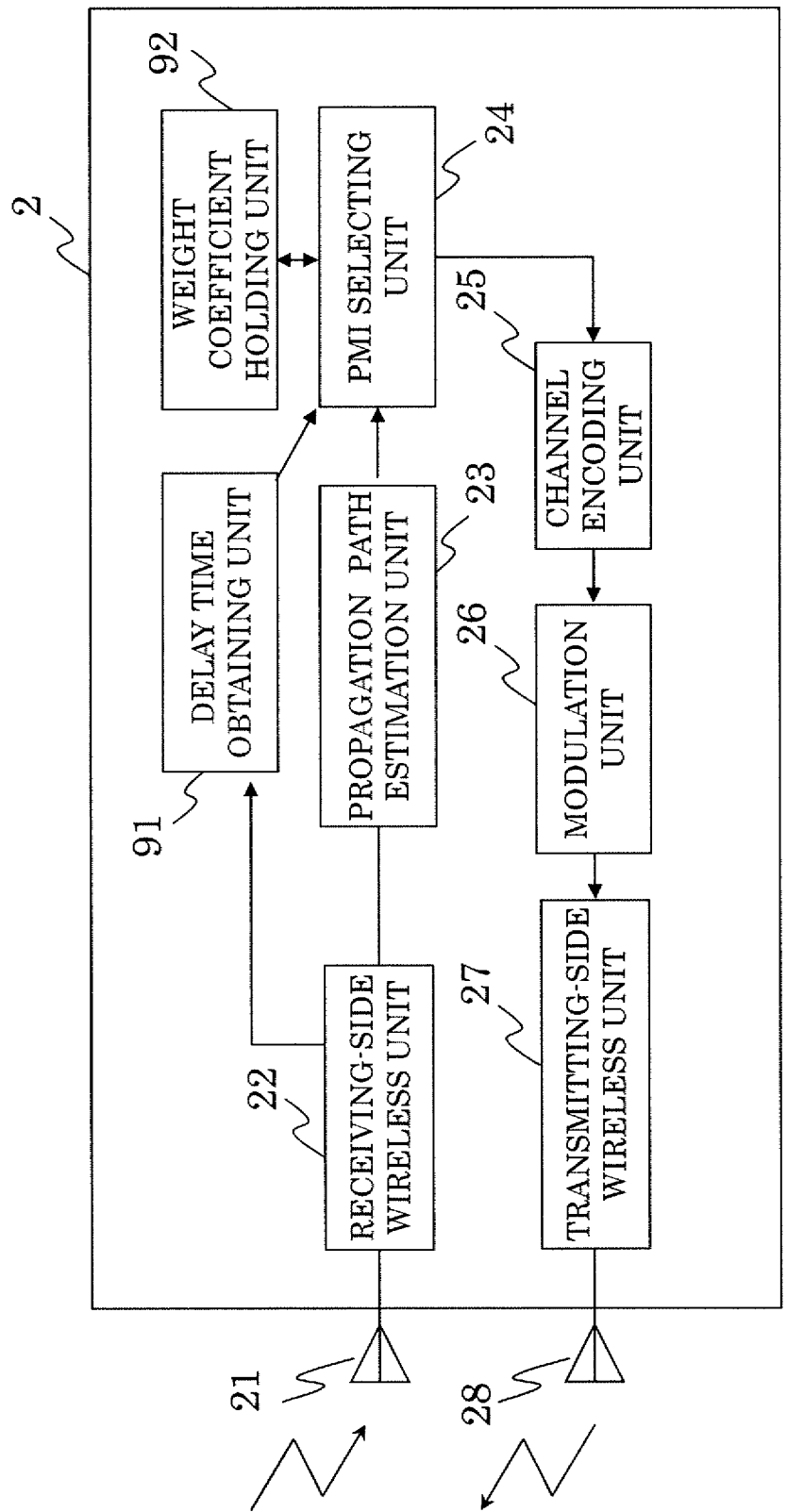
FIG. 9 is a diagram illustrating an example of a portion of a configuration of the receiving station 2 in Embodiment 3.

FIG. 9 is a diagram illustrating an example of a portion of a configuration of the receiving station 2 in Embodiment 3. The receiving station 2 in Embodiment 3 includes a delay time obtaining unit 91 and a weight coefficient holding unit 92 as a portion of its configuration in addition to the configuration in Embodiment 1. Each of these units is a software component, a hardware component or a combination of software and hardware components (see Section <Others>). The receiving station 2 in Embodiment 3 differs in processing in the delay time obtaining unit 91, the weight coefficient holding unit 92 and the PMI selecting unit 24 from that in Embodiment 1. Description will be made below only of points of difference in configuration from Embodiment 1.

The delay time obtaining unit 91 obtains notice delay times $X_A$ and $X_B$, by demodulating and decoding the baseband signal received from the receiving-side wireless unit 22. The notice delay times $X_A$ and $X_B$, as described above (see FIG. 5), represent the time period from the time at which the receiving station 2 transmits the PMI(1) to the time at which the serving station 1-1 transmits a signal to which the PMI(1) is applied and the time period from the time at which the receiving station 2 transmits the PMI(1) to the time at which the collaborative station 1-2 transmits a signal to which the PMI(1) is applied. The notice delay times $X_A$ and $X_B$ are sent from the serving station 1-1, for example, by a communication sequence performed between this station and the serving station 1-1 in order to start CoMP. The delay time obtaining unit 91 holds the obtained notice delay times $X_A$ and $X_B$.

The weight coefficient holding unit 92 holds a combination (PM) of weight coefficients determined by the PMI selecting unit 24 by associating the combination with the timing of the determination.

The PMI selecting unit 24 receives propagation path estimated values $h_A$ and $h_B$ from the propagation path estimation unit 23 and receives the notice delay times $X_A$ and $X_B$ from the delay time obtaining unit 91. The PMI selecting unit 24 determines the weight coefficient $w_A$ to be used in the serving station 1-1 and the weight coefficient $w_B$ to be used in the collaborative station 1-2 by using these sorts of information and the weight coefficients held in the weight coefficient holding unit 92, as described below.

Figure 10:
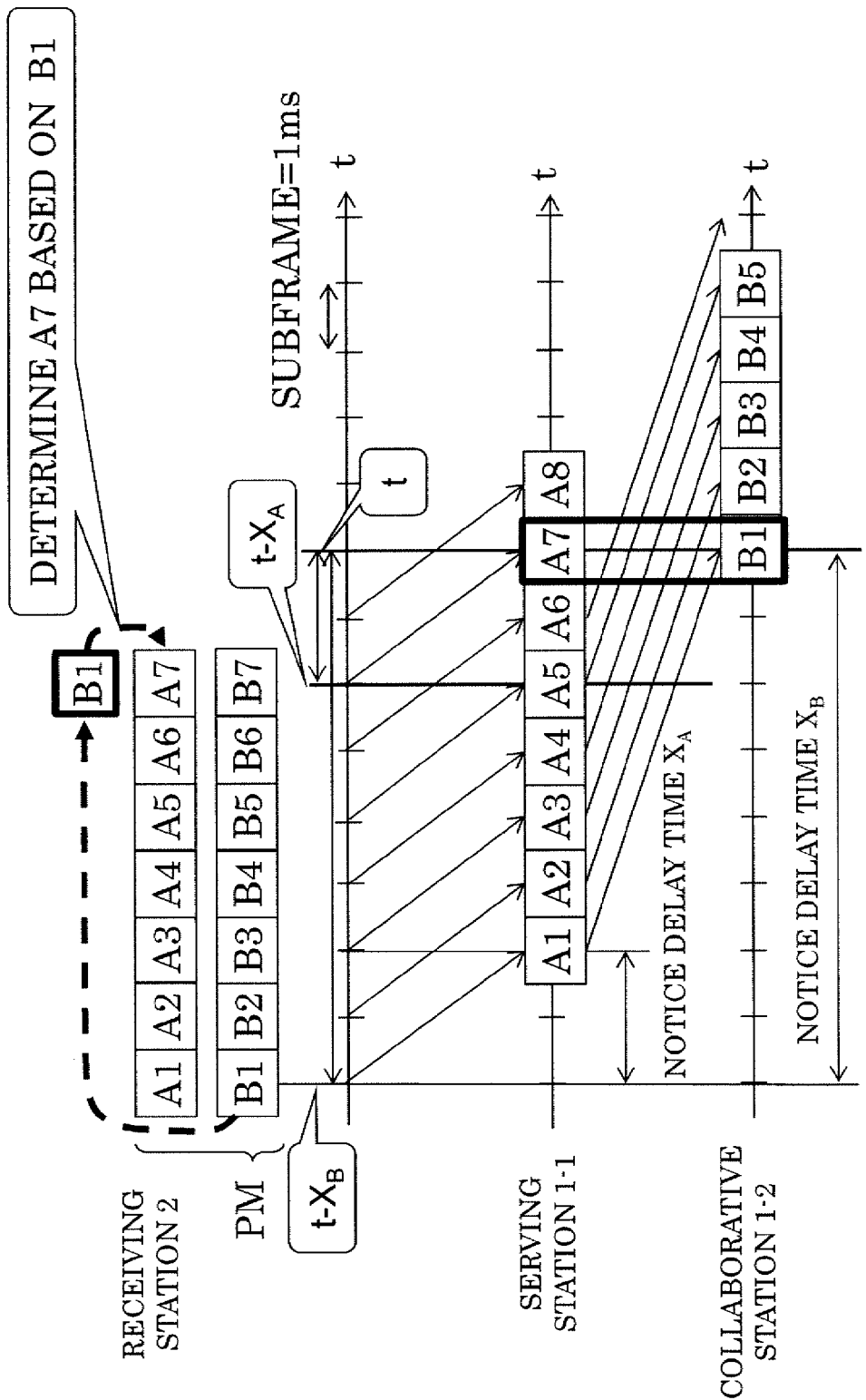
FIG. 10 is a concept diagram illustrating PMI selecting processing in Embodiment 3.

FIG. 10 is a concept diagram illustrating PMI selecting processing in Embodiment 3. In FIG. 10, the abscissa represents time t, and an example of notification of the serving station 1-1 of PMI notice values at intervals of 1 millimeter/second (ms) from the receiving station 2 is illustrated. Also, in FIG. 2, notice delay time $X_A=2$ ms with respect to the serving station 1-1 and notice delay time $X_B=8$ ms with respect to the collaborative station 1-2 are indicated for ease of description, while the communication delay between the transmitting stations is about 40 m (ms).

The PMI selecting unit 24 can recognize, by using the notice delay times $X_A$ and $X_B$, by which timing the weight coefficients determined by each timing are used in the serving station 1-1 and the collaborative station 1-2. In the example illustrated in FIG. 10, the PMI selecting unit 24 can recognize that the weight coefficient A7 determined at time $(t-X_A)$ is applied to a signal to be transmitted at time t in the serving station 1-1, and that the weight coefficient B1 determined at time $(t-X_B)$ is applied to a signal to be transmitted at time t in the collaborative station 1-2.

In Embodiment 1, combinations of weight coefficients (the combination of A1 and B1 and the combination of A7 and B7) are separately determined at time $(t-X_A)$ and time $(t-X_B)$. In the method in Embodiment 1, the association between the weight coefficients used in the serving station 1-1 and the collaborative station 1-2 by certain timing is weak. Therefore the PMI selecting unit 24 in Embodiment 3 determines weight coefficients such that a correlation occurs between the weight coefficients applied to signals to be transmitted by actual collaborative transmission.

In the example illustrated in FIG. 10, the PMI selecting unit 24 determines the weight coefficient A7 at time $(t-X_A)$ by using the weight coefficient B1 according to the combination of the weight coefficients (A7 and B1) applied to signals to be transmitted at time t from the serving station 1-1 and the collaborative station 1-2. More specifically, the PMI selecting unit 24 obtains the weight coefficient B1 determined at time $(t-X_B)$ from the weight coefficient holding unit 92 and determines the weight coefficient A7 by using the weight coefficient B1 and propagation path estimated values $h_A(t-X_A)$ and $h_B(t-X_A)$ estimated at the time.

The weight coefficient A7 is determined by extracting $w_A(t-X_A)$ with which the value of (Expression 7) below is maximum. In (Expression 7), $w_A(t)$ represents the weight coefficient for the serving station 1-1 determined at time t; $w_B(t)$ represents the weight coefficient for the collaborative station 1-2 determined at time t; and $h_A^T(t)$ and $h_B^T(t)$ represent propagation path estimated values estimated at time t. The weight coefficient B1 determined at time $(t-X_B)$ is assigned as $w_B(t-X_B)$, and propagation path estimated values determined at time $(t-X_A)$ are assigned as $h_A(t-X_A)$ and $h_B(t-X_A)$.

$$|h_A^T(t-X_A)w_A(t-X_A)+h_B^T(t-X_A)w_B(t-X_B)|^2 \quad \text{(Expression 7)}$$

After determining the weight coefficient A7 for the serving station 1-1, the PMI selecting unit 24 selects the weight coefficient B7 in combination with the weight coefficient A7 from the code book. That is, in a case where the determined weight coefficient $w_A(t-X_A)$ corresponds to one PMI, the PMI selecting unit 24 selects, as a weight coefficient $w_B(t-X_A)$ at time $(t-X_A)$, the other element in the PM identified by means of the PMI.

However, in a case where the determined weight coefficient $w_A(t-X_A)$ corresponds to two or more PMIs, a weight coefficient $w_B(t-X_A)$ is not uniquely determined. In such a case, a plurality of PMI notice value candidates are selected from the code book. The PMI selecting unit 24 selects, from PMs as the PMI notice value candidates, a weight coefficient $w_B(t-X_A)$ with which the value of (Expression 8) below is maximum.

$$|h_B^T(t-X_A)w_B(t-X_A)|^2 \quad \text{(Expression 8)}$$

In some case, for example, at an initial stage of startup of the receiving station 2, no weight coefficient $w_B(t-X_B)$ is held in the weight coefficient holding unit 92 at the time of computation of a weight coefficient $w_A(t-X_A)$ performed as described above. In such a case, if a time at which a weight coefficient is first determined after startup of the receiving station 2 is 0, $0 \le t < X_B$ can be expressed.

In such a case, the PMI selecting unit 24 first determines a weight coefficient $w_A(t-X_A)$ at time $t-X_A$, for example, by using (Expression 9) below.

$$|h_A^T(t-X_A)w_A(t-X_A)|^2 \quad \text{(Expression 9)}$$

The PMI selecting unit 24 selects from the code book a weight coefficient $w_A(t-X_A)$ with which the value of (Expression 9) is maximum. At this time, if there is one PMI corresponding to the selected weight coefficient $w_A(t-X_A)$, a weight coefficient $w_B(t-X_A)$ is uniquely selected from the code book.

If there are two or more PMIs corresponding to the selected weight coefficient $w_A(t-X_A)$, a weight coefficient $w_B(t-X_A)$ is not uniquely selected. The PMI selecting unit 24 then selects, from PMs as PMI notice value candidates, a weight coefficient $w_B(t-X_A)$ with which the value of (Expression 8) above is maximum.

In the above explanation, assuming a case where a weight coefficient is determined at time $(t-X_A)$ in the receiving station 2, to make description using (Expression 7), a process has been described in which the delay time obtaining unit 91 in the receiving station 2 obtains notice delay times $X_A$ and $X_B$, and weight coefficients are determined by using these notice delay times $X_A$ and $X_B$. Such an arrangement, however, is considered equivalent to an arrangement in which the delay time obtaining unit 91 obtains a delay time $X_C$ $(=X_B-X_A)$ between the serving station 1-1 and the collaborative station 1-2 and weight coefficients are determined by using this $X_C$.

That is, in a case where a weight coefficient is determined at time t in the receiving station 2, a weight coefficient $w_B(t-X_C)$ determined time $X_C$ before for the collaborative station 1-2 is the same as the weight coefficient $w_B(t-X_A)$ in the above description. In this case, the PMI selecting unit 24 obtains the weight coefficient $w_B(t-X_C)$ from the weight coefficient holding unit 92 and selects, from the code book, by using this weight coefficient $w_B(t-X_C)$ and the propagation path estimated values $h_A(t)$ and $h_B(t)$, a weight coefficient $w_A$ with which the value of (Expression 10) below is maximum.

$$|h_A^T(t)w_A(t)+h_B^T(t)w_B(t-X_C)|^2 \quad \text{(Expression 10)}$$

While Embodiment 3 has been described with respect to a case where the receiving station 2 has one receiving antenna, a similar arrangement can also be implemented even in a case where the receiving station 2 has two or more receiving antennas. If the number of receiving antennas of the receiving station 2 is $N_r$, the sizes of the propagation path estimated values $h_A$ and $h_B$ are $N_{tA} \times N_r$ and $N_{tB} \times N_r$, respectively.

Thus, in the wireless communication system in Embodiment 3, the receiving station 2 obtains notice delay times with respect to the transmitting stations and holds weight coefficients determined in the past. By considering each of the obtained notice delay times, the receiving station 2 determines a weight coefficient supposed to be used in the serving station 1-1 according to timing of use of the weight coefficient in the collaborative station 1-2 by using a weight coefficient determined in the past for the collaborative station 1-2.

According to Embodiment 3, the latest propagation environment is reflected for the collaborative station 1-2 in the weight coefficient used in the serving station 1-1 and a better combination of this weight coefficient and the weight coefficient applied in the collaborative station 1-2 to a signal to be transmitted by collaborative transmission is obtained. As a result, the quality of receiving at the receiving station 2 in application of CoMP can be improved.

[Embodiment 4]

The receiving station 2 in Embodiment 3 determines, by using a weight coefficient $w_B(t-X_B)$ used with respect to the receiving station 2 in the collaborative station 1-2 with a largest notice delay time $(X_B)$ before a certain transmitting timing point t, a weight coefficient $w_A(t-X_A)$ to be used in the serving station 1-1 at the transmitting timing point t with respect to the receiving station 2. The receiving station 2 in Embodiment 4 uses a predetermined fixed value as a weight coefficient $w_B$ to be used in the collaborative station 1-2.

The wireless communication system in Embodiment 4 has the same configuration as that in Embodiment 1. The transmitting stations 1-1 and 1-2 have the same configuration as that in Embodiment 1 (see FIG. 4). Description will be made below of processings in the transmitting stations 1-1 and 1-2 different from those in the other embodiments.

In Embodiment 4, when the CoMP control unit 10 in the collaborative station 1-2 recognizes itself as a collaborative station with respect to the receiving station 2, it notifies the PM selecting unit 131 of this recognition. The PM selecting unit 131 then determines as a fixed value a weight coefficient to be used with respect to the receiving station 2. On the other hand, when the CoMP control unit 10 in the serving station 1-1 recognizes itself as a serving station with respect to the receiving station 2, it does not transfer to the collaborative station 1-2 a PMI notice value obtained by demodulation processing in the demodulation unit 18 from a signal transmitted from the receiving station 2. The predetermined fixed value of the weight coefficient $w_B$ used in the collaborative station 1-2 may be notified from another node such as a base station controller (not illustrated), or each transmitting station may have, as the predetermined fixed value of the weight coefficient $w_B$, a value determined in advance in the system. The serving station 1-1 notifies the receiving station 2 of the predetermined fixed value of the weight coefficient $w_B$, for example, in the communication sequence between itself and the receiving station 2 at the time of starting CoMP. The receiving station 2 may also hold the predetermined fixed value of the weight coefficient $w_B$ in advance.

The receiving station 2 has the same configuration as that in Embodiment 1 (see FIG. 2). Description will be made below only of processing in the receiving station 2 different from that in Embodiment 1.

When propagation path estimated values $h_A(t-X_A)$ and $h_B(t-X_A)$ are input at time $(t-X_A)$ from the propagation path estimation unit 23, the PMI selecting unit 24 in the receiving station 2 selects, from the code book, by using the weight coefficient $w_B$ as a fixed value, a weight coefficient $w_A(t-X_A)$ with which the value of (Expression 11) below is maximum.

$$|h_A^T(t-X_A)w_A(t-X_A)+h_B^T(t-X_A)w_B|^2 \quad \text{(Expression 11)}$$

Since the collaborative station 1-2 performs precoding by using the weight coefficient $w_B$ as a fixed value determined in advance, the elements for the collaborative station 1-2 in PMs contained in the code book held in the system are equal to each other.

Figure 11:
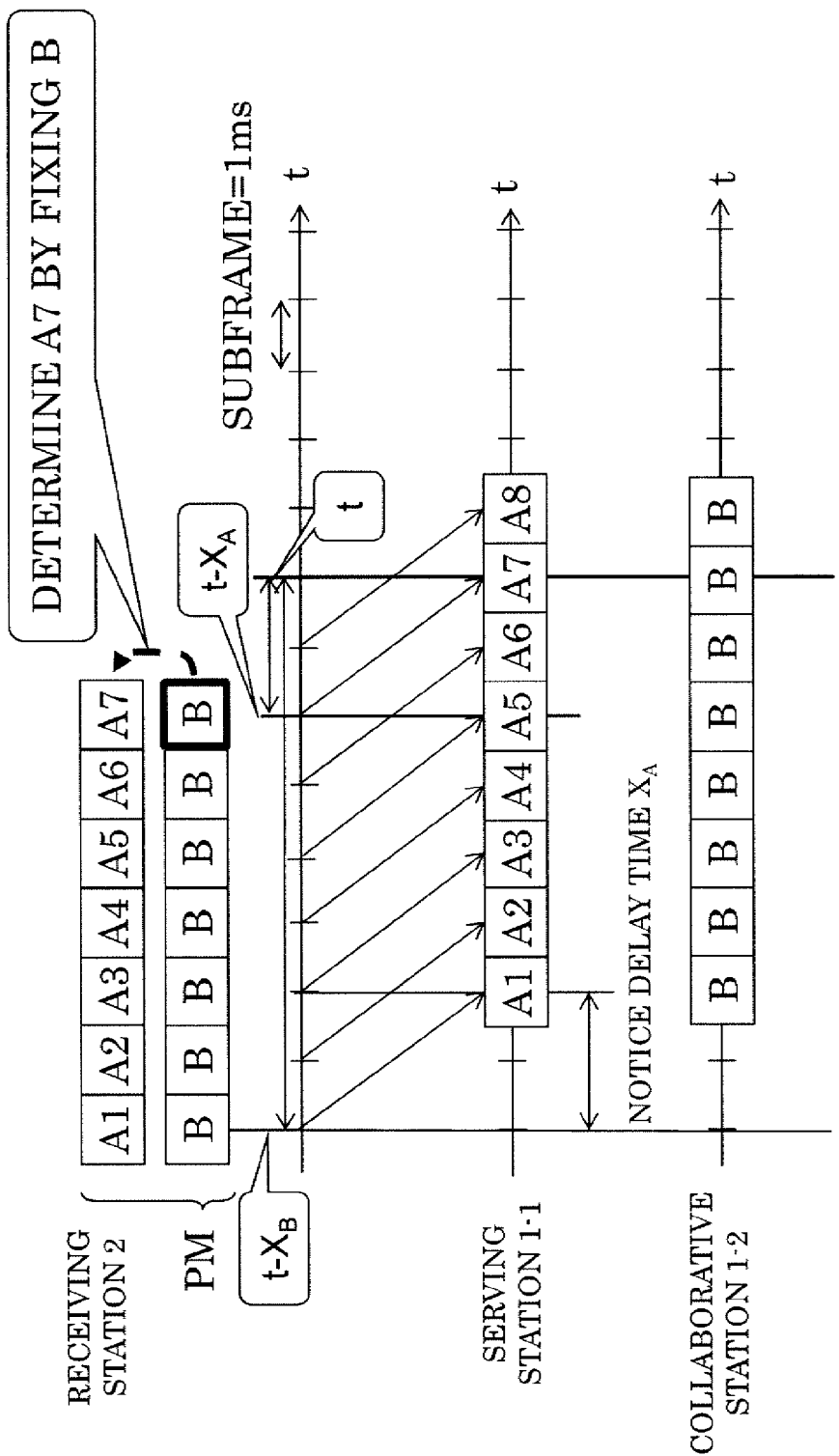
FIG. 11 is a concept diagram illustrating PMI selecting processing in Embodiment 4.

FIG. 11 is a concept diagram illustrating PMI selecting processing in Embodiment 4. FIG. 11 illustrates an example in which the receiving station 2 notifies PMI notice values at intervals of 1 ms to the serving station 1-1. In FIG. 11, notice delay time $X_A=2$ ms with respect to the serving station 1-1 is indicated for ease of description.

As illustrated in FIG. 11, the receiving station 2 determines a weight coefficient for the serving station 1-1 by using at each timing point the weight coefficient $w_B$ as a fixed value determined in advance. The serving station 1-1 receives each PMI notice value from the receiving station 2 and performs precoding of a signal to be sent to the receiving station 2 by using a weight coefficient in the predetermined element in the PM identified by means of the PMI notice value. The collaborative station 1-2 performs precoding of a signal to be sent to the receiving station by using at each timing point a weight coefficient $w_B$ as a fixed value determined in advance.

Thus, in Embodiment 4, the collaborative station 1-2 uses the weight coefficient $w_B$ as a fixed value determined in advance, so that no PMI notice value transfer delay occurs between the serving station 1-1 and the collaborative station 1-2. Therefore the correlation between the propagation path condition reflected in the weight coefficient used for precoding in the serving station 1-1 and the propagation path condition when a signal precoded with the weight coefficient is transmitted is increased. As a result, the quality of receiving at the receiving station 2 of data transmitted from the serving station 1-1 can be improved. The reason for using the fixed weight coefficient not in the serving station 1-1 but in the collaborative station 1-2 is that due to a large communication delay between the serving station 1-1 and the collaborative station 1-2, the correlation between the propagation environment reflected in the weight coefficient used in the collaborative station 1-2 and the propagation environment at the time of actual transmission is inevitably reduced.

Figure 12:
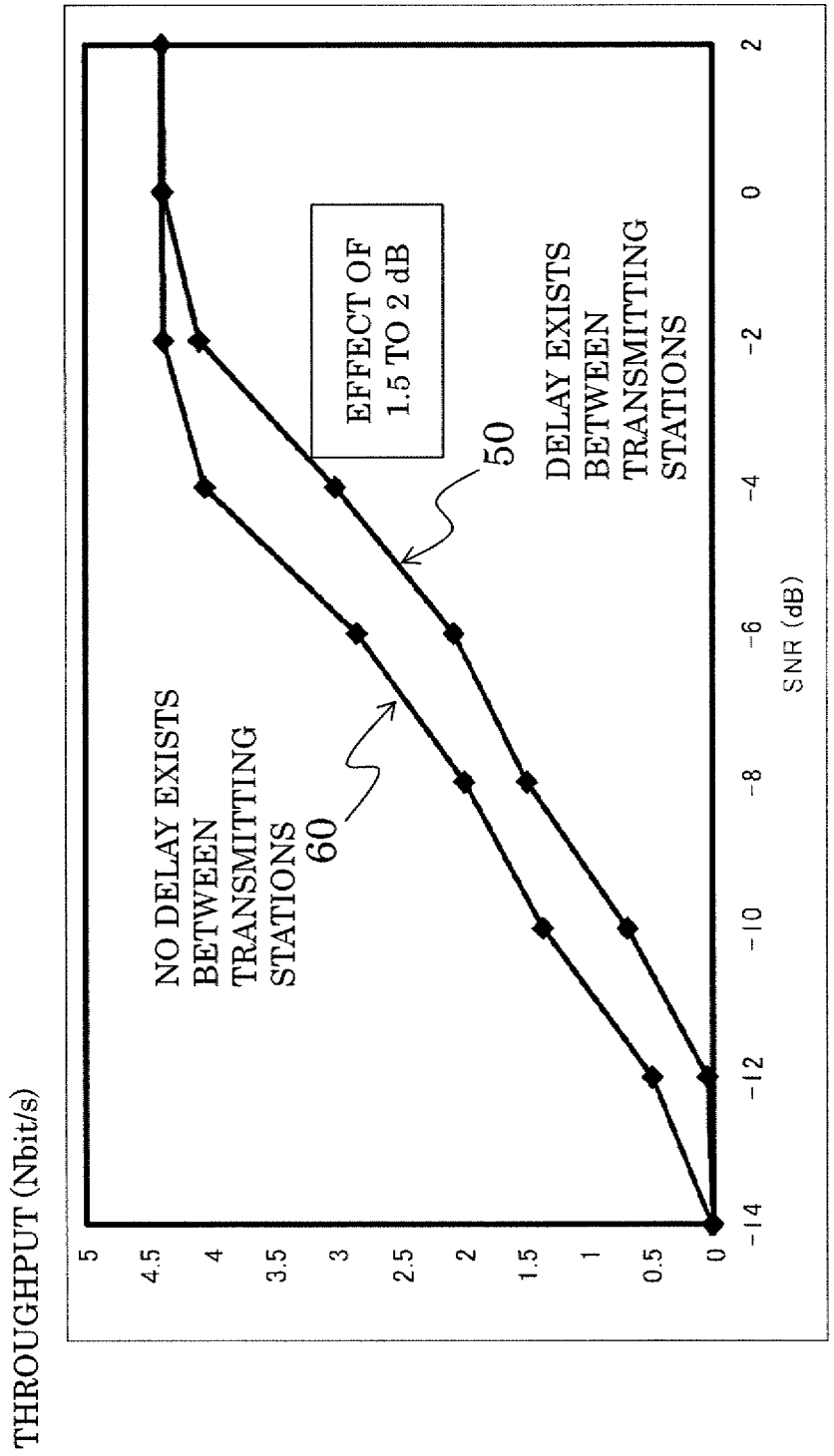
FIG. 12 is a diagram indicating results of computer simulations of a case of using the method in Embodiment 4 and a case of using the conventional method.

FIG. 12 is a diagram indicating results of computer simulations of a case of using the method in Embodiment 4 and a case of using the conventional method. Each simulation is performed by assuming a case where the serving station 1-1 and the collaborative station 1-2 perform CoMP by means of their respective single transmitting antennas. As a propagation environment, Extended Vehicular A, which is one of path models defined in 3GPP, is used and the moving speed of the mobile terminal (MS) as the receiving station 2 is set to 5 km/h. In FIG. 12, the relationship between the SNR and the throughput is indicated as a simulation result.

Reference numeral 50 indicates a simulation result in the case of using the conventional method. In the conventional method, the transfer delay between the serving station 1-1 and the collaborative station 1-2 is set to 40 ms and precoding is performed by using weight coefficients corresponding to the elements of one PMI notice value. The 40 ms delay set as the transfer delay between the serving station 1-1 and the collaborative station 1-2 is known as an ordinary transfer delay in a case where the X2 interface is used. Reference numeral 60 indicates a simulation result in the case of using the method in Embodiment 4, i.e., the method of performing precoding with the collaborative station 1-2 using a weight coefficient as a predetermined fixed value.

It can be understood from FIG. 12 that the SNR in the case of using the method in Embodiment 4 is improved by 1.5 to 2 dB in comparison with the case of using the conventional method. This is thought to be for the reason that the method in Embodiment 4 enables avoiding the influence of the transfer delay between the serving station and the collaborative station and thereby improves the compliance to fading fluctuations.

Embodiment 4 has been described by assuming that the weight coefficient $w_B$ used in the collaborative station 1-2 is a predetermined fixed value. However, the predetermined fixed value is not limited to one value. For example, weight coefficients used at timing points may be determined in advance as different values $w_{B1}$, $w_{B2}$, $w_{B3}$, and so on.

[Modification of Embodiment 4]

In Embodiment 4, as described above, the weight coefficient $w_B$ used in the collaborative station 1-2 is set to a fixed value. In this case, the serving station 1-1 may determine a mode of CoMP in a way described below.

Figure 13:
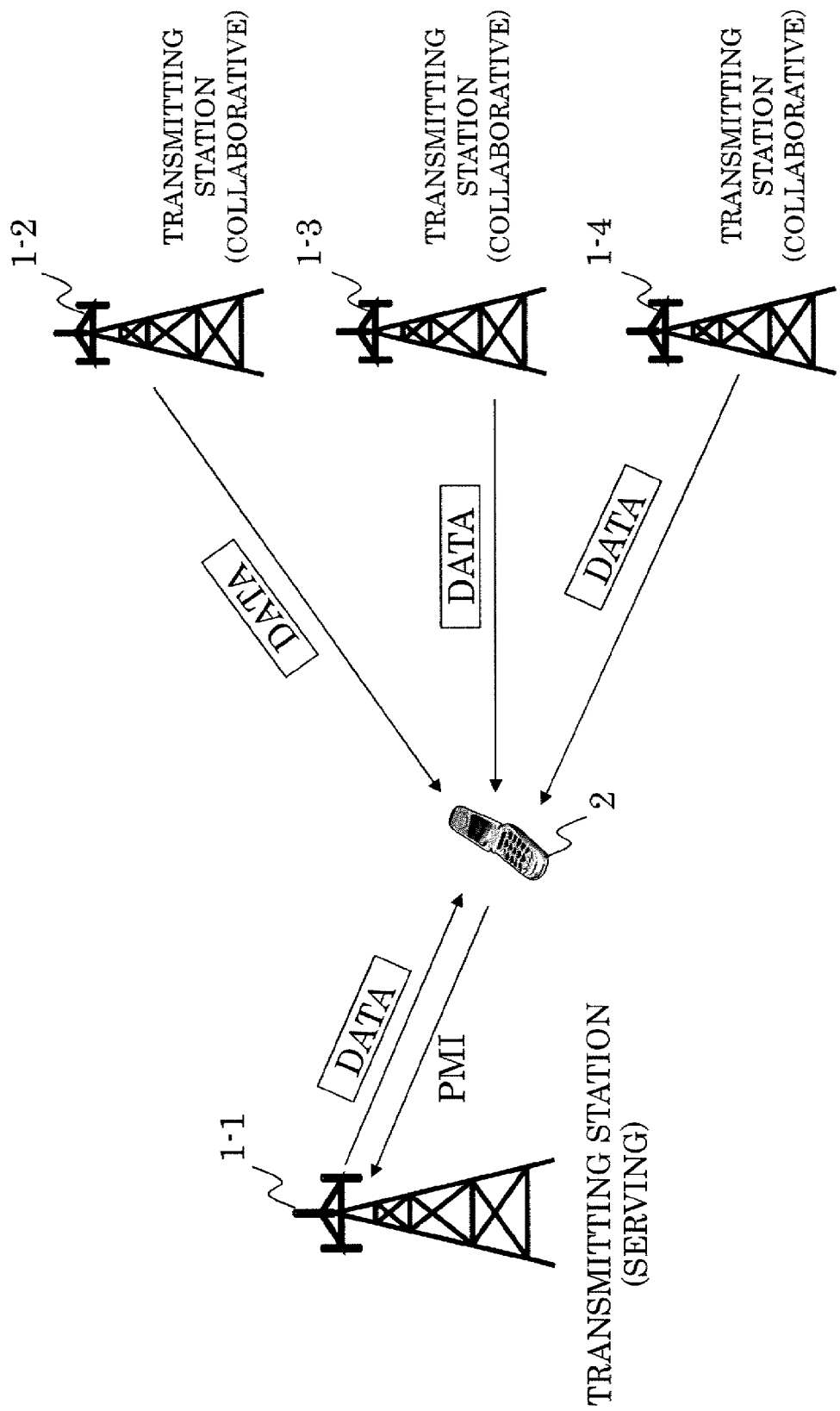
FIG. 13 is a diagram illustrating an example of a configuration of a wireless communication system provided with four transmitting stations.
Figure 14:
FIG. 14 is a diagram indicating an example of assignments of transmitting antennas.

In a case where, for example, as illustrated in FIG. 13, four transmitting stations 1-1, 1-2, 1-3, and 1-4 exist and execute CoMP on the receiving station 2 by using four transmitting antennas, modes such as illustrated in FIG. 14 exist. FIG. 13 is a diagram illustrating an example of a configuration of a wireless communication system provided with four transmitting stations. FIG. 14 is a diagram indicating an example of assignments of transmitting antennas.

In this modified example, it is determined to use one transmitting antenna in each collaborative station. In the example illustrated in FIG. 14, one of modes in one of cases 1 (1-1, 1-2, 1-3), 3 (3-1, 3-2, 3-3), and 6 is selected. This selection is made in order to reduce interference components in the receiving station 2 and to assign as much a number of transmitting antennas as possible to the serving station capable of performing precoding following the propagation path condition.

If CoMP is not performed in a situation where the receiving station 2 receives signals from the four transmitting stations, the serving station 1-1 performs communication by using four antennas, and signals from the other three transmitting stations to the receiving station 2 act as interfering signals. On the other hand, when one of the transmitting stations use two transmitting antennas in a case where CoMP is performed, interference occurs. However, when CoMP is performed by using one transmitting antenna at each of the four stations, all the received signals are changed into desired signal components, so that interference components disappear. In a case where it is determined to perform CoMP among the four transmitting stations, therefore, the effect of reducing interference components in the receiving station 2 can be highest in the case 6 illustrated in FIG. 14.

In Embodiment 4 described above, the weight coefficient used in the collaborative station is fixed and the weight coefficient used in the serving station is adaptively controlled. Therefore, if the number of transmitting antennas of the serving station in which weight coefficient is controlled by following the propagation path is larger, the performance of receiving at the receiving station 2 is improved. In a case where it is determined to perform CoMP among three of the transmitting stations, the case 3-1, for example, is selected.

From the above, in this modified example, modes described below are selected in a case where CoMP is executed on the receiving station 2 by using four transmitting antennas, i.e., in a case such as illustrated in FIG. 14.

(1) In a case where CoMP is executed by using four transmitting antennas, the case 6 in all the cases illustrated in FIG. 14 is selected.

(2) In a case where CoMP is executed among three transmitting stations (serving station 1-1, collaborative station 1-2, collaborative station 1-3) by using four transmitting antennas, the case 3-1 in the cases 1-1, 1-2, 2-1, 2-2, 3-1, 4-1, 4-2, 5-1, and 5-3) illustrated in FIG. 14 is selected.

(3) In a case where CoMP is executed among three transmitting stations (serving station 1-1, collaborative station 1-2, collaborative station 1-4) by using four transmitting antennas, the case 3-2 in the cases where "0" is set in the transmitting station 1-3 column as illustrated in FIG. 14 is selected.

(4) In a case where CoMP is executed among three transmitting stations (serving station 1-1, collaborative station 1-3, collaborative station 1-4) by using four transmitting antennas, the case 3-3 in the cases where "0" is set in the transmitting station 1-2 column as illustrated in FIG. 14 is selected.

(5) In a case where CoMP is executed between two transmitting stations (serving station 1-1, collaborative station 1-2) by using four transmitting antennas, the case 1-1 in the cases where "0" is set in both the transmitting station 1-3 column and the transmitting station 1-4 column as illustrated in FIG. 14 is selected.

(6) In a case where CoMP is executed between two transmitting stations (serving station 1-1, collaborative station 1-3) by using four transmitting antennas, the case 1-2 in the cases where "0" is set in both the transmitting station 1-2 column and the transmitting station 1-4 column as illustrated in FIG. 14 is selected.

(7) In a case where CoMP is executed between two transmitting stations (serving station 1-1, collaborative station 1-4) by using four transmitting antennas, the case 1-3 in the cases where "0" is set in both the transmitting station 1-2 column and the transmitting station 1-3 column as illustrated in FIG. 14 is selected.

Figure 15:
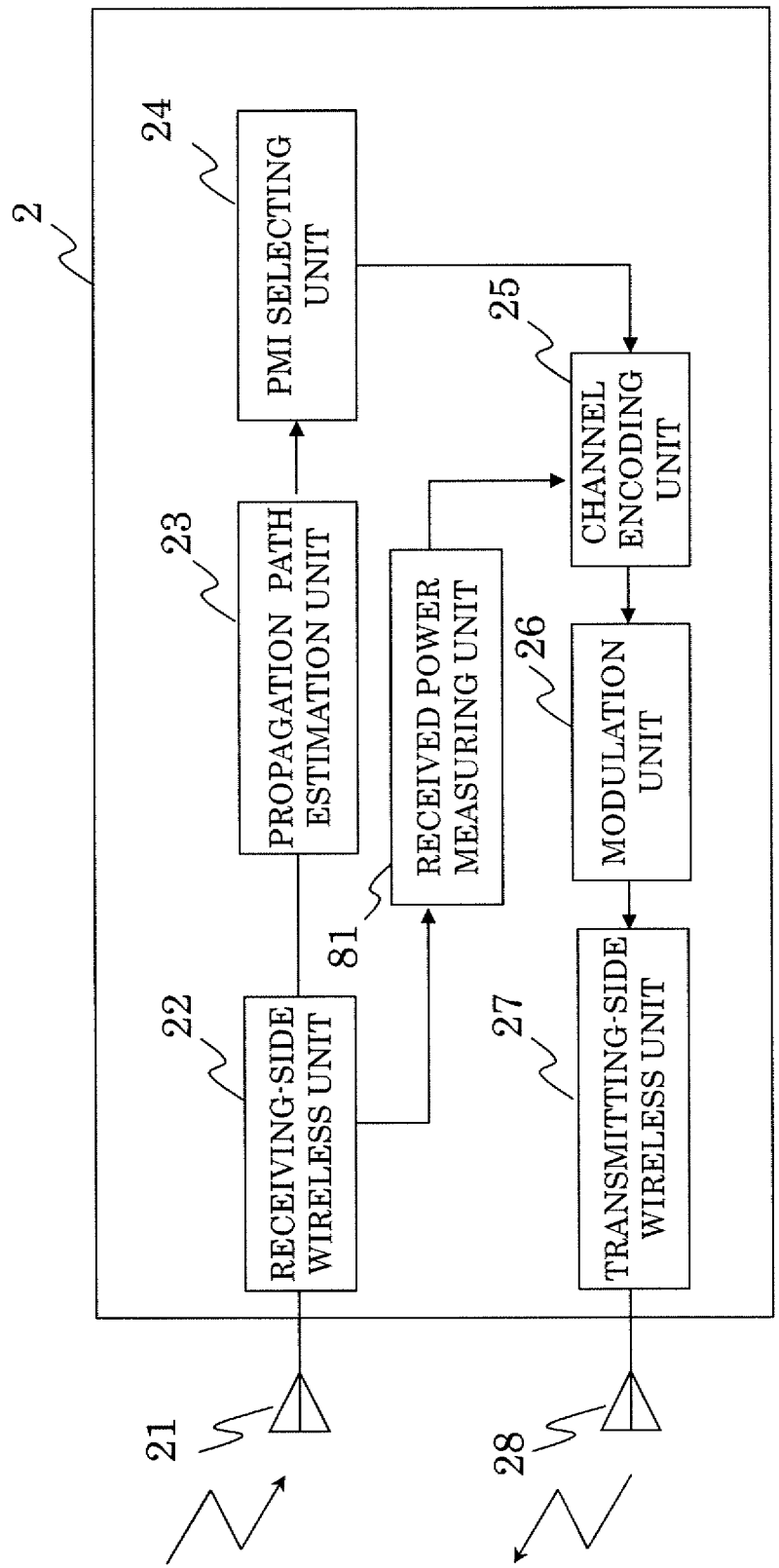
FIG. 15 is a diagram illustrating an example of a portion of a configuration of the receiving station 2 in the modified example of Embodiment 4.

FIG. 15 is a diagram illustrating an example of a portion of a configuration of the receiving station 2 in the modified example of Embodiment 4. The receiving station 2 includes a received power measuring unit 81 as a portion of its configuration in addition to the configuration in Embodiment 1. This unit is a software component, a hardware component or a combination of software and hardware components (see Section <Others>).

When the received power measuring unit 81 receives received signals separated from signals from the transmitting stations 1-1, 1-2, 1-3, and 1-4 by processing in the receiving-side wireless unit 22, it measures the received power of each received signal. The received power measuring unit 81 sends the measured received power of the each received signal to the channel encoding unit 25. The received powers of the received signals undergo processing in the channel encoding unit 25, the modulation unit 26 and the transmitting-side wireless unit 27 and are thereafter sent from the transmitting antenna 28 to the serving station 1-1. For example, transmission of the received powers to the serving station 1-1 is performed as part of processing at the time of starting CoMP on the receiving station 2.

Receiving the received powers transmitted from the receiving station 2, the CoMP control unit 10 in the serving station 1-1 selects, by the above-described method, one of the cases 1, 3, and 6 illustrated in FIG. 14, and selects one of the modes in the selected case as a mode of CoMP on the receiving station 2. The CoMP control unit 10 compares each received power with a predetermined threshold value and excludes from the CoMP mode the transmitting station that has delivered the power recognized as received power lower than the threshold value. For example, in a case where the transmitting stations 1-2, 1-3, and 1-4 are selected as candidates for collaboration to perform CoMP on the receiving station 2, one of the cases 3 (3-1, 3-2, and 3-3) is selected when one of the received powers is determined as lower than the threshold value.

Further, the CoMP control unit 10 excludes, from the selected case, one of the transmitting stations when the corresponding received power is determined as lower than the threshold value, thereby selecting one of the modes as a mode of CoMP on the receiving station 2. For example, if it is determined that the received power from the transmitting station 1-4 is lower than the threshold value in a case where the case 3 is selected, the case 3-1 (indicated by the arrow in FIG. 14) is selected. In this case, the mode is determined in which the transmitting stations 1-2 and 1-3 are respectively set as collaborative stations; the serving station 1-1 uses two transmitting antennas; and each of the collaborative stations 1-2 and 1-3 uses one transmitting antenna.

The CoMP control unit 10 notifies the CoMP mode determined in this way to the collaborative stations 1-2 and 1-3 through the in-system interface control unit 19. Further, the CoMP control unit 10 notifies the determined CoMP mode to the receiving station 2 by using a predetermined channel. After such processing is performed, CoMP on the receiving station 2 is executed in the wireless communication system in this modified example.

In this CoMP, each transmitting station determined as a collaborative station uses a predetermined fixed value such as indicated in Embodiment 4 as a weight coefficient used for precoding of a signal to be transmitted from the antenna used according to the CoMP mode.

[Others]
<Regarding Hardware Component and Software Component>

The hardware component is a hardware circuit, examples of which include a field programmable gate array (FPGA), an application specific integrated circuit (ASIC), a gate array, a combination of logical gates, a signal processing circuit, and an analog circuit.

The software component is a part (piece) that realizes the above described processes as software, and is not a concept that limits a language, a development environment and the like that realize the software. Examples of the software component include a task, a process, a thread, a driver, firmware, a database, a table, a function, a procedure, a subroutine, a predetermined part of a program code, a data structure, an array, a variable, and a parameter. These software components are realized on one or more memories (one or more processors (for example, CPUs, DSPs (Digital Signal Processor) or the like).

Note that each embodiment described above does not limit an approach for realizing the processing units described above. The processing units may be configured as the above described hardware component or software component, or the combination thereof, according to an approach that can be realized by a person of ordinary skill in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A wireless communication system in which at least a first base station and a second base station among a plurality of base stations transmit data signals to a mobile terminal by collaborating with each other,
the first base station including:
   a wireless receiving unit that receives from the mobile terminal identification information indicating a combination of a weight coefficient for the first base station and a weight coefficient for the second base station determined according to an estimated value of a propagation path condition between the first base station and the mobile terminal and an estimated value of a propagation path condition between the second base station and the mobile terminal;
   a transfer unit that transfers the identification information received by the wireless receiving unit to the second base station; and
   a first precoding unit that performs precoding of a data signal to be transmitted by collaborative transmission to the mobile terminal performed by the first base station and the second base station according to predetermined timing, by using the weight coefficient for the first base station identified by means of latest identification information in the identification information received by the wireless receiving unit,
the second base station including:
   an information receiving unit that receives the identification information transferred from the first base station; and
   a second precoding unit that performs precoding of a data signal to be transmitted by collaborative transmission together with the data signal transmitted from the first base station according to the predetermined timing, by using the weight coefficient for the second base station identified by means of identification information obtained as latest identification information in the identification information received by the information receiving unit and different from that for the weight coefficient for the first base station used for precoding of the data signal to be transmitted by collaborative transmission according to the predetermined timing.

2. The wireless communication system according to claim 1, wherein the first base station further includes a notification unit that notifies a communication delay time period between the first base station and the second base station to the mobile terminal, and wherein the weight coefficient for the first base station is a value determined by using the weight coefficient for the second base station determined before the communication delay time period and used in the second precoding unit on the data signal to be transmitted from the second base station in collaboration with the data signal precoded with the weight coefficient for the first base station.

3. A wireless communication system in which at least a first base station and a second base station among a plurality of base stations transmit data signals to a mobile terminal by collaborating with each other,
the first base station including:
   a wireless receiving unit that receives from the mobile terminal identification information indicating a weight coefficient for the first base station determined according to an estimated value of a propagation path condition between the first base station and the mobile terminal and an estimated value of a propagation path condition between the second base station and the mobile terminal; and a first precoding unit that performs precoding of a data signal to be transmitted by collaborative transmission to the mobile terminal performed by the first base station and the second base station according to predetermined timing, by using the weight coefficient for the first base station identified by means of latest identification information in the identification information received by the wireless receiving unit, the second base station including:

a second precoding unit that performs precoding of the data signal to be transmitted by collaborative transmission together with the data signal transmitted from the first base station according to the predetermined timing, by using a weight coefficient for the second base station as a fixed value determined in advance.

4. The wireless communication system according to claim 3, wherein the first base station further includes:

a state information receiving unit that receives, from the mobile terminal, groups of state information respectively indicating states of receiving in the mobile terminal of a signal from base stations other than the second base station that transmit the data signal to the mobile terminal in collaboration with the first base station, and a signal from the second base station; and a mode determination unit that determines the number of transmitting antennas of the first base station for transmitting the data signal to the mobile terminal by collaborative transmission based on the groups of state information received from the state information receiving unit, and determines at least one base station among the second base station and the other base stations to transmit the data signal to the mobile terminal in collaboration with the first base station.

5. A mobile terminal that receives data signals that at least a first base station and a second base station transmit by collaborating with each other, the mobile terminal comprising:

a computation unit that computes a first estimated value indicating a propagation path condition between the first base station and the mobile terminal and a second estimated value indicating a propagation path condition between the second base station and the mobile terminal;

a storage unit that stores a plurality of combinations of a first weight coefficient used for precoding in the first base station and a second weight coefficient used for precoding in the second base station;

a selecting unit that selects, from the plurality of combinations stored in the storage unit, by using the first estimated value and the second estimated value computed by the computation unit, a combination of the first weight coefficient and the second weight coefficient used for precoding of the data signals transmitted by collaborative transmission from the first base station and the second base station; and a holding unit that holds identification information for identifying each combination selected by the selecting unit at each selecting timing point; and a receiving unit that receives a communication delay time period between the first base station and the second base station from the first base station, wherein at the time of selecting a combination of the first weight coefficient and the second weight coefficient used for precoding of the data signals transmitted to the mobile terminal by the first base station and the second base station collaborating with each other, the selecting unit obtains from the holding unit the second weight coefficient contained in one of the combinations received from the receiving unit before the communication delay time period, and determines the first weight coefficient among the combinations stored in the storage unit and including the obtained second weight coefficient based on the first estimated value and the second estimated value computed by the computation unit.

6. A collaborative communication method in which at least a first base station and a second base station among a plurality of base stations transmit data signals to a mobile terminal by collaborating with each other, the method comprising:

the first base station receiving from the mobile terminal identification information indicating a combination of a weight coefficient for the first base station and a weight coefficient for the second base station determined according to an estimated value of a propagation path condition between the first base station and the mobile terminal and an estimated value of a propagation path condition between the second base station and the mobile terminal, transferring the received identification information received to the second base station, and performing precoding of a data signal to be transmitted by collaborative transmission to the mobile terminal performed by the first base station and the second base station according to predetermined timing, by using the weight coefficient for the first base station identified by means of latest identification information in the received identification information, and the second base station receiving the identification information transferred from the first base station, and performing precoding of a data signal to be transmitted by collaborative transmission together with the data signal transmitted from the first base station according to the predetermined timing, by using the weight coefficient for the second base station identified by means of identification information obtained as latest identification information in the received identification information and different from that for the weight coefficient for the first base station used for precoding of the data signal to be transmitted by collaborative transmission according to the predetermined timing.

7. A collaborative communication method in which at least a first base station and a second base station in a plurality of base stations transmit data signals to a mobile terminal by collaborating with each other, the collaborative communication method comprising:

the first base station receiving from the mobile terminal identification information indicating a weight coefficient for the first base station determined according to an estimated value of a propagation path condition between the first base station and the mobile terminal and an estimated value of a propagation path condition between the second base station and the mobile terminal, and performing precoding of a data signal to be transmitted by collaborative transmission to the mobile terminal performed by the first base station and the second base station according to predetermined timing, by using the weight coefficient for the first base station identified by means of latest identification information in the received identification information, and the second base station performing precoding of the data signal to be transmitted by collaborative transmission together with the data signal transmitted from the first base station according to the predetermined timing, by using a weight coefficient for the second base station as a fixed value determined in advance.

* * * * *